United States Patent [19]

Materna et al.

[11] Patent Number: 5,433,476

[45] Date of Patent: Jul. 18, 1995

[54] TEMPERATURE COMPENSATED STORED GAS INFLATOR

[75] Inventors: Peter Materna, Metuchen; Geoffrey L. Mahon, Ridgewood, both of N.J.

[73] Assignee: Breed Automotive Technology, Inc., Lakeland, Fla.

[21] Appl. No.: 281,429

[22] Filed: Jul. 27, 1994

[51] Int. Cl.⁶ .............................................. B60R 21/26
[52] U.S. Cl. ..................................... 280/736; 280/742
[58] Field of Search ................. 280/736, 737, 740, 741, 280/742

[56] References Cited

U.S. PATENT DOCUMENTS

| | | | |
|---|---|---|---|
| 3,180,373 | 11/1961 | Hebenstreit | 141/4 |
| 3,767,228 | 10/1973 | Lewis | 280/735 |
| 3,773,352 | 11/1973 | Radke | 280/731 |
| 3,897,962 | 8/1975 | Sack | 280/736 |
| 3,985,375 | 10/1976 | Lewis et al. | 280/737 |
| 4,200,615 | 4/1980 | Hamilton et al. | 422/166 |
| 4,380,346 | 4/1983 | Davis et al. | 280/736 |
| 4,394,033 | 7/1993 | Goetz et al. | 280/736 |
| 4,817,828 | 4/1989 | Goetz | 222/3 |
| 4,846,368 | 7/1989 | Goetz | 222/3 |
| 4,886,293 | 12/1989 | Weiler et al. | 280/736 |
| 5,054,811 | 10/1991 | Unterforsthuber et al. | 280/742 |
| 5,056,815 | 10/1991 | Geisreiter | 280/736 |
| 5,060,974 | 10/1991 | Hamilton et al. | 280/736 |
| 5,064,459 | 11/1991 | Unterforsthuber et al. | 55/512 |
| 5,078,422 | 1/1992 | Hamilton et al. | 428/513 |
| 5,230,531 | 7/1993 | Hamilton et al. | 280/737 |
| 5,263,740 | 11/1993 | Frey et al. | 280/737 |
| 5,320,382 | 6/1994 | Goldstein et al. | 280/735 |
| 5,345,876 | 9/1994 | Rose et al. | 102/531 |

Primary Examiner—Kenneth R. Rice
Attorney, Agent, or Firm—Kane, Dalsimer, Sullivan, Kurucz, Levy, Eisele and Richard

[57] ABSTRACT

A stored gas inflator is operable over a wide range of initial temperatures and such that the dependence of its total output as a function of initial temperature is substantially reduced.

A vessel contains gas under pressure and has a seated outlet for the gas which is adapted to open upon command and permit passage of the gas therethrough.

A thermal reservoir element is provided.

A first exiting flowpath directs gas so that it substantially bypasses or avoids thermal contact with the thermal reservoir element.

A second exiting flowpath directs whatever gas does not leave through the first exiting flowpath through the thermal reservoir element so that the gas has substantial thermal contact with the thermal reservoir element.

A temperature-dependent flow control means varies the amount of gas passing through each of the aforementioned flowpaths.

71 Claims, 17 Drawing Sheets

TEMPERATURE COMPENSATED STORED GAS INFLATOR

FIELD OF THE INVENTION

The present invention relates to an apparatus for inflating an inflatable device such as an inflatable vehicle occupant restraint.

BACKGROUND OF THE INVENTION

In the history and development of inflators for inflating vehicle occupant protection inflatable restraints (airbags), one of the earliest types of devices tried was a stored gas system. Such a system consists of a pressure vessel containing gas at high pressure, a rupturable wall in the pressure vessel, means for causing the rupturable wall to rupture upon command, flow-directing passageways to conduct the gas to the airbag, and the airbag itself. When the inflator was operated, the rupturable wall was caused to fail, and the high pressure stored gas rapidly flowed out of the pressure vessel, inflating the airbag. In a traditional stored gas inflator, these are the only significant components. In recent years, traditional stored gas airbag systems have not been widely used.

One of the drawbacks which have prevented the wide use of traditional stored gas inflators is the fact that their output varies significantly with ambient temperature. Airbag inflators are typically specified to operate over a wide temperature range such as −40 C. to +90 C, which represents extreme winter conditions and hot summer conditions in bright sunlight.

The output of an inflator is commonly judged as the rise in pressure in a closed receiving tank when an inflator is discharged into it. The receiving tank is typically the same volume or similar volume as the inflated bag. The rise in tank pressure (final pressure in the receiving tank at the end of the transient compared to initial pressure in the receiving tank) is indicative of the amount of energy which the inflator has produced. When an inflator is discharged into an actual airbag, the majority of this output energy (typically 70% to 90%) is used to fill or expand the bag from its folded position of essentially zero volume to its full volume, and then the remaining small minority of the energy (typically 10% to 30%) is used to raise the pressure of the bag above atmospheric after the bag has been filled (pressurization). For sake of discussion herein and for better understanding of the invention, the middle value may be assumed, i.e., the output of the inflator at a baseline condition is 1.0 energy unit and 0.8 energy units are used for filling the bag and 0.2 energy units are used for pressurizing.

It can be further supposed that because of a reason such as dependence of inflator output on ambient temperature, the inflator output under other conditions may increase to 1.55 energy units. The energy required to fill the bag would remain at 0.8 energy units, but then the energy left over to pressurize the bag would then be 0.75 energy units, an amount which is almost four times what it was in the baseline case. This would significantly increase the peak overpressure (peak pressure in the bag above atmospheric pressure) in the bag, although given the fact that the bag has vents which were not considered in this discussion, the increase would be less than the factor of nearly four. Still, this illustrates that the peak overpressure in the bag is quite sensitive to variations in inflator output. In this example an increase of 55% in inflator output energy resulted in an increase in bag peak overpressure of much more than 55%. The peak overpressure in the bag is an important parameter both because of strength limitations of the bag material and because the performance of the bag in absorbing the occupant's kinetic energy is influenced by the peak bag pressure.

With this in mind, it can be understood why the output of a traditional stored gas inflator varies undesirably with temperature. In absolute terms the temperature range just discussed, for which the inflator is specified to operate, is 233 K. to 363 K., and the ratio of these absolute temperatures is 1.55. Assuming an ideal gas and neglecting any amount of gas which remains inside the inflator after the inflation, the output energy of a traditional stored gas inflator should vary roughly in proportion to the initial absolute temperature of the gas. For most real gases (particularly nitrogen and argon, which are most commonly used), the actual ratio of hot output to cold output for this temperature range is even larger than this number for an ideal gas, due to thermodynamic nonidealities of these gases. With such a large variation, an inflator which filled the bag completely at the lower extreme temperature would be at risk of bursting or tearing the bag open at hot temperature, or at least it would not produce good characteristics for absorbing the impact of a vehicle occupant. In the other way of looking at it, if the inflator or bag size were adjusted so that the bag had proper characteristics at the upper extreme temperature, then at cold initial temperature the inflator would only fill the bag to a portion of its full volume. Neither of these situations is acceptable.

The inflator technologies which are in widespread use today are less sensitive to temperature than the traditional stored gas situation just described, but they do have dependence on temperature. Pure pyrotechnic inflators produce their gas from the combustion of solid chemicals. The combustion process is described by a burn rate which is dependent on the initial temperature of the pyrotechnic material, and it is possible that completeness of combustion may also be affected by initial temperature. Another inflator technology is hybrid inflators, which combine stored gas and solid pyrotechnic chemicals. In a hybrid inflator, the temperature dependence of the stored gas portion of the output is roughly as just described for traditional stored gas inflators, but the portion of the output obtained from pyrotechnic chemicals has less variation with temperature, and so the overall performance of this type of inflator shows less variation with initial temperature than does a pure stored gas inflator. Nevertheless, it can be said that for all of these inflator technologies, temperature dependence of the output is still an issue.

If the temperature dependence of the stored gas inflator could be improved, it would offer an inflator which has significant advantages with respect to several issues that are of increasing importance in the automotive industry. Increasing attention is currently being paid to the amounts of solid particulate and of potentially irritating gaseous substances which are contained in the output gas from inflators utilizing solid pyrotechnic chemicals. This concern is for the comfort, convenience and health of the vehicle occupants when the airbag is used. An improved stored gas inflator would be free of these particulate and objectionable gaseous emissions except perhaps for a minimal amount of emissions resulting from a pyrotechnic initiator which might be used at the rupture disc sealing off the stored gas vessel to initiate rupture of the rupture disc. Also, with the manufacture of airbag inflators now amounting to many millions of units per year, it becomes more apparent that the toxicity of some pyrotechnic substances, particularly sodium azide, is a problem. The toxicity is a problem both during manufacturing and for eventual disposal or recycling of used cars. An improved stored gas inflator would solve all of these health and environmental problems.

In addition, the improved stored gas inflator described here is relatively simple compared to most other inflators, and this has beneficial implications for reliability and for reduction of cost. For any new vehicle with its unique crash characteristics and unique dimensional requirements for the inflator, there is effort and expense involved in developing a vehicle-specific inflator, and a significant part of this effort and expense is related to filtration. Temperature compensated stored gas technology essentially eliminates the whole topic of filtration from the inflator development process, except possibly for a very small extent of filtration related to the rupture disc initiation means if that initiation means is pyrotechnic in nature.

OBJECTS OF THE INVENTION

Accordingly, it is an object of this invention to produce an improved stored gas inflator whose output has less dependence on initial temperature than does the output of a traditional stored gas inflator of the prior art.

It is another object of this invention that the inflator be simple in design and that its temperature compensation features function as passively as possible.

It is further an object of this invention to provide a stored gas inflator of the foregoing type which has no environmental or health problems in regard to the contents or composition of its emissions or the substances which are used in its manufacture.

It is still another object of this invention to eliminate as much as possible the need for filtration in a stored gas inflator of the foregoing type.

SUMMARY OF THE INVENTION

During the process of discharging pressurized gas from a pressure vessel, the gas which remains behind in the pressure vessel (has not yet been discharged) becomes colder and colder as the discharge progresses. The same is true of the instantaneous temperature of the exiting gas. The situation is most commonly illustrated by the familiar example of the chilling of an aerosol can as it is discharged (although the aerosol can is not totally comparable because it often contains liquid as well as gas). This phenomenon is explained by the first law of thermodynamics, which states that the internal energy of the remaining gas is decreased by the enthalpy of the exiting gas. The enthalpy is a larger quantity than the internal energy. Thus, the total internal energy of the remaining gas decreases faster than does its mass, which means that the temperature of the remaining gas decreases. The particular example of the first law is identified as uniform flow unsteady state in Thermodynamics by Van Wylen and Sonntag.

For the situation of a stored gas inflator, the gas storage pressure may typically be 14 MPa to 42 MPa (2000 psi to 6000 psi). The ratio of storage pressure to discharge (atmospheric) pressure can thus be quite extreme (a ratio of 140:1 to 420:1). Because of this, the temperature of the gas exiting the pressure vessel near the end of the discharge can be quite low, in the range of 50 K. to 100 K., which is roughly 200 K. lower than the initial temperature. This rather low gas temperature suggests the possibility or desirability of adding heat back into the gas. Toward this end, the present invention proposes utilizing convective heat transfer from some device deliberately placed in the path of the gas. In traditional pyrotechnic inflators there typically is a non-negligible amount of heat transfer by convection (ref. Advances in Analytical Modeling of Pyrotechnic Airbag Inflators by Peter Materna, Society of Automotive Engineers Paper 920120). In such an inflator the heat transfer is from the flowing hot gas to the wire mesh filter which is colder than the gas. However, the same type of analysis would tell us that it should also be possible for an object to give heat to the gas by convection if the direction of temperature difference were reversed.

It can be further realized that the heat added to the gas by convection does not have to come from an object which would ordinarily be thought of as hot. The heat can in fact come from a thermal reservoir element which started out at whatever was the initial temperature of the stored gas inflator before discharge. It should be appreciated that even if both the stored gas and the thermal reservoir element start out at a seemingly-cold −40 C., the thermal reservoir element can still serve as a source of heat to the later-exiting gas, because the later-exiting gas is always substantially colder than the initial temperature at which the gas was stored. The requirement for the thermal reservoir device merely to be in thermal equilibrium with the gas at the initial temperature of the gas in the inflator before discharge makes this a very passive and hence foolproof technique.

Another associated requirement for using this effect to moderate the temperature dependence of a stored gas inflator is to arrange that this augmentation of the temperature of the exiting gas by means of convective heat transfer should occur at cold initial conditions but not at hot initial conditions. This requires the use of a temperature-dependent flow control device. Such a device must act so that at cold initial conditions a relatively large fraction of the exiting gas will flow through the thermal reservoir, so that its temperature will be augmented by convection. Conversely, at hot initial conditions, it is desired that little or no gas will exit by flowing through the thermal reservoir, so that there is as little as possible augmentation of the gas temperature by convective heat transfer. Causing the gas to flow through the thermal reservoir element and thereby receive heat is referred to herein as compensation. The flowpath which conducts gas through the thermal reservoir element is referred to as the compensated flowpath, and the flowpath which conducts gas so as to avoid the thermal reservoir element is referred to as the noncompensated flowpath. The overall inflator, in which much of the gas is compensated at cold initial conditions but little or no gas is compensated at hot initial conditions, is referred to as a temperature compensated stored gas inflator.

In order to further appreciate or evaluate the potential of the compensation technique, it is useful to calculate how much heat can be put back into the gas by this means. Let us begin by considering the discharge of a gas with no compensation or replenishment of heat. The simplest calculation method is to assume the ideal gas law and also the relations describing enthalpy and internal energy for a perfect gas. These classical relations are:

$$pV = mRT$$

$$Cp = R*\text{gamma}/(\text{gamma}-1)$$

$$Cv = R*1/(\text{gamma}-1)$$

$$h = Cp*T = R*T*\text{gamma}/(\text{gamma}-1)$$

$$u = Cv*T = R*T/(\text{gamma}-1)$$

$$h/u = Cp/Cv = \text{gamma}$$

$$u*m = m*R*T/(\text{gamma}-1)$$

$$h*m = m*R*T*\text{gamma}/(\text{gamma}-1)$$

As further approximation, it is useful to consider the limiting case where a stored volume of gas discharges completely, i.e., discharges to vacuum. (This further assumes that the gas never condenses.) In the present situation the ratio between storage pressure and receiving pressure is only several hundred rather than infinity, but the ratio is large enough that this result is useful for understanding the invention. According to the first law of thermodynamics, at the end of the transient, the total mass*enthalpy of the gas which exits the storage vessel and enters the receiving tank is equal to the mass*internal energy of the stored gas. Let us denote the conditions in the receiving tank and the storage vessel by subscripts rec and stor, respectively.

$$h(rec)*m = u(stor)*m$$

Applying the relation between h and u to the gas in the receiving tank, $$u(rec) = (1/\text{gamma})*h(rec) = (1/\text{gamma})*u(stor)$$

This says, briefly, that the final average temperature of the gas in the receiving tank is 1/gamma times the initial temperature of the stored gas. In the case of a monatomic gas such as helium, where gamma (the ratio of specific heat at constant pressure to specific heat at constant volume) is 1.67, the final average temperature of the gas in the receiving tank is 0.6 times the initial temperature of the stored gas. More specifically, if the gas is discharged from a hot condition of 363 K. (90 C.), which is a typical automotive specified upper temperature limit, and there is no heat transfer to the gas, then the final temperature of the gas in the receiving tank would be 0.6*363 K. or 218 K. Similarly, if gas started out at 233 K. (−40 C.) (a typical automotive specified lower temperature limit) and underwent a similar process, its final temperature would be 0.6*233 K. or 140 K.

The basic principle of the present invention is to take advantage of the fact that at this cold condition a thermal reservoir at the 233 K. initial temperature can supply heat to the exiting gas by convection. If the reservoir had a sufficiently large heat capacity and sufficient surface area and heat transfer coefficient to provide essentially perfect equilibration, it could in theory bring the temperature of the discharged gas from 140 K. all kS the way back up to 233 K. This is actually slightly hotter than the 218 K. just calculated as the receiving tank gas temperature for the case of hot initial temperature. This surprising result states that by this simple and passive compensation means, not only would it be possible to narrow the range of inflator performance over the stated temperature range to essentially zero, but it would actually be possible to make the inflator produce more output energy at a cold (−40 C.) condition than at a hot (+90 C.) condition. This is surprising because in all traditional inflators the total discharged energy at hot conditions is larger than at cold conditions, and often substantially larger.

In practice, efficiency issues limit the practical benefit of this technique to less than 100% of the theoretical maximum just calculated. Nevertheless, useful compensation can be obtained. It is found that a likely design point would be such that over the specified range of temperature, the total output gas energy would increase by about half of the fraction by which the absolute temperature increases. For the example hot and cold extreme temperatures used in this discussion, the high temperature is 55% higher than the low temperature. For the embodiments of interest, the inflator output might vary such that at hot conditions the total inflator output energy (measured as the rise in receiving tank pressure) would be larger than the corresponding output at cold conditions by less than 30%. This makes the narrowness of the output range of this inflator comparable to or narrower than the output range of existing inflators manufactured using other technologies.

Figure 1:
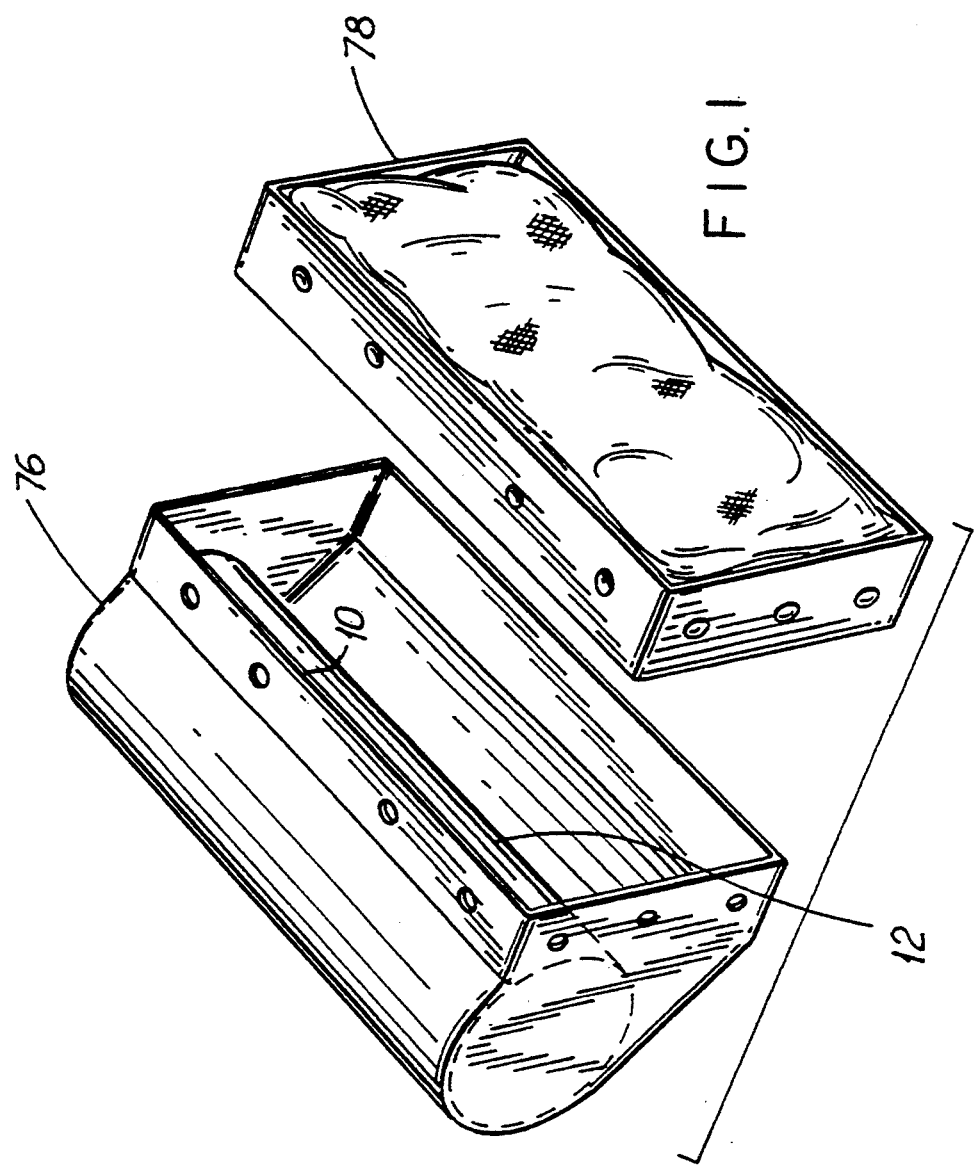
FIG. 1 is an exploded perspective view of a diffuser housing containing a stored gas inflator and a folded airbag assembly.

In all of these illustrations, for clarity of illustration, the slot widths and thermal motion distances are shown out of scale and exaggerated.

DETAILED DESCRIPTION

In essence, a temperature compensated stored gas inflator comprises a pressure vessel whose boundary includes a sealing means such as a rupturable wall that can be caused to rupture on command; a thermal reservoir element; two exit paths for the gas, one which provides little or no contact with the thermal reservoir element and the other which brings the gas into close contact with the thermal reservoir element; and a temperature dependent flow control device.

First of all, the thermal reservoir element is required to passively exist at essentially the same temperature as the stored gas, as the inflator undergoes gradual temperature changes due to changes in the environment to which it is exposed. Another functional requirement for the thermal reservoir element is that it must supply sufficient heat to the exiting gas when gas is directed to exit through the thermal reservoir element. This means that the thermal reservoir element must have sufficient heat capacity, which is determined by its mass and material properties, and it must have sufficient surface area, which is determined by the geometry in which it is manufactured. The thermal reservoir element must also have appropriate mechanical strength to withstand pressure differences during the discharge transient without suffering gross crushing or deformation. It is also necessary that the thermal conductivity of the material be such that the individual fibers or strands empty heat from most or all of their cross-section during the duration of the transient.

A very good way of promoting thermal equilibrium between the stored gas and the thermal reservoir element is to locate the thermal reservoir element inside the pressure vessel. At the high pressure and corresponding high density of the stored gas, the natural convection heat transfer coefficient between the gas and the thermal reservoir element will be much larger than under atmospheric conditions, and this will promote rapid and complete thermal equilibration between the gas and the thermal reservoir element as the external temperature changes. If the inflator is used as an airbag inflator which is installed inside the instrument panel or similar region of a vehicle, it is likely that the time scale over which any temperature variation is imposed will be at least many minutes, and experience indicates a metal wire mesh will equilibrate quite closely with the stored gas within a few minutes of any hypothetical sudden change of stored gas temperature. If the thermal reservoir element were outside the stored gas region but within the same inflator assembly, it would probably also still maintain a reasonably close thermal equilibrium with the stored gas, but not as exactly as if the thermal reservoir element were inside the pressure vessel. There is also a certain efficiency of space utilization gained by putting the thermal reservoir element inside the pressure vessel, because the interstices or empty spaces within the thermal reservoir element are usable for storage of gas.

Probably the easiest form in which to manufacture the thermal reservoir element is as a wire mesh. However, the thermal reservoir element could be made in any other form which also exposes a substantial surface area to the gas flow, such as porous matrix structures such as sintered materials made from wires, sintered materials made from spheres, and sintered materials made from any other shapes. The thermal reservoir element could also be a structure resembling a sponge in which the solid parts are all connected to each other but the pores are also all connected to each other. Visually, the thermal reservoir element may resemble a filter, but it does not function as a filter because the stored gas exiting through the thermal reservoir element does not contain any particulate. Yet another geometry in which the thermal reservoir element could possibly be made is a honeycomb, which is typically made by intermittently joining thin sheets of a metal such as aluminum and then pulling the sheets apart to form open cells.

The packing density of a mesh describes how closely the mesh is packed. If a mesh is 25% dense, it means that within a macroscopic object or shape made of mesh, 25% of the volume is solid and 75% is empty space, or, in other words, the weight of the object is 25% of the weight of a solid piece of the same material with the same external dimensions. A typical packing density of the wire mesh used here is 25% of solid density. A mesh packing density can only go as high an upper limit of about 40%, for reasons of geometric packing and manufacturability. The mesh packing density should preferably stay above approximately 10% or else it will not have much structural rigidity.

The best way of characterizing the mass or heat capacity of the thermal reservoir element is by the ratio of its heat capacity (mass times specific heat) to the heat capacity of the stored gas (mass of stored gas times specific heat at constant pressure of the gas). For the inflator described here which inflates a 150 liter airbag, assuming the use of aluminum wire mesh, a mass of aluminum wire of 140 grams is appropriate. The stored gas, as described later, can be approximately 50 grams of helium (depending on the desired extent of overfilling of the bag). Then, the just-defined ratio of heat capacities is 0.5. If the ratio of heat capacities becomes quite small, say 0.1, then the thermal reservoir element runs out of heat capacity and drops its temperature too much before the gas finishes exiting through it. If the ratio becomes rather large, say 10, then the compensation works well but there is a penalty to be paid in terms of carrying around unnecessary weight all during the life of the vehicle.

The amount of surface area of the thermal reservoir element also affects its usefulness. Assuming the mesh is made of aluminum wire, an appropriate diameter for the wire is 0.25 mm (0.010 inch). However, the usable range of wire diameters could be quite wide, approximately from 1 mm (0.039 inch) down to a practical wire manufacturing limit which might be 0.0025 mm (0.0001 inch). The thermal reservoir material exhibits a thermal wave advancing into the reservoir as time progresses. Thermal wave behavior of the opposite situation, a hot gas entering a cold reservoir element, has been described in Advances in Analytical Modeling of Pyrotechnic Airbag Inflators by Peter Materna, Society of Automotive Engineers Paper 920120. Because in this case the entering gas is colder than the reservoir, the most upstream part of the reservoir cools down first, and later the more downstream parts cool down. If the surface area, heat transfer coefficient and residence time of the gas within the thermal reservoir are sufficient, by the time the gas reaches the most downstream end of the thermal reservoir, its temperature is close to that of the most downstream portion of the reservoir.

It is appropriate here to consider the choice of material for the thermal mesh, since this is a topic which is generic to all of the embodiments presented later. The material for the thermal reservoir element could be any material which is capable of being woven or knitted or made into a porous matrix. Metals are good candidate materials for the thermal reservoir element because they are easily drawn into wire and woven, are mechanically strong and have good thermal conductivity. Aluminum could be considered the preferred material for the wire of the wire mesh because among metals it has one of the largest heat capacities per unit weight. Stainless steel is a possible alternate which is more efficient in terms of heat capacity per unit volume, but less efficient in terms of heat capacity per unit weight. Plastics such as nylon are also possible candidates for the thermal reservoir element. One good feature of plastics such as nylon is that their heat capacity per unit weight is even larger than that of aluminum. However, attention must be paid to the mechanical strength of such materials and to assuring that the thermal conductivity is sufficient to achieve heat release from almost the entire cross-section of the fiber during the brief time period of the transient. These properties area affected by details of formulation and additives in ways which are known in the art.

It is necessary that the thermally responsive valving device operate by a means which is simple and reliable. One of the simplest and most reliable mechanisms is the thermal expansion of solid materials. This would typically involve two parts of substantially the same shape, anchored to each other at some point and otherwise free to move relative to each other, such that the change in length caused by thermal expansion provides a motion which increases or decreases a flow area. In general, as will be presented in the embodiments, the actual distance of available relative thermal motion is of the order of 0.015 inch (0.37 mm), which is rather small compared to other inflator dimensions and dimensional requirements. In order to achieve required flow areas for exiting gas using the thermal expansion phenomenon, considering that an area is essentially one dimension times a dimension in a perpendicular direction, it is necessary to combine this small dimension with another much larger dimension. As a result, the flow areas which are temperature-dependent tend to be slots which are long and narrow. Other geometries such as arrays of many small holes are also possible. It is believed that the principal descriptor which governs the flow through the temperature dependent valving device is the open flow area, largely independent of geometry. In a part made of plastic, the slots would probably be molded when the part is formed. In general, other manufacturing methods which could be applicable to the production of slots include travelling wire electrical discharge machining (for parts made of metal), water jet cutting, stamping, and other methods. It is important that the corners (edges) of the slots where the valving occurs should be sharp rather than rounded. If the edges were rounded, that would create a leakage path or at least would change the effective position at which complete shutoff of flow occurred.

It is also appropriate to explain generically the choice of materials which make up the thermal expansion valving device. The valving or variation of orifice area is the result of relative motion between two parts having different thermal expansion coefficients, one of them a high thermal expansion coefficient and the other low. In order to achieve the desired variation of area with temperature, it is helpful that the thermal expansion coefficients of these materials be as different as possible from each other.

The low thermal expansion material could be a metal such as aluminum, steel or stainless steel. It could even be Invar, which is 36% Ni, balance Fe, and has a nearly zero thermal expansion coefficient. The use of a metal for the low thermal expansion part could also provide mechanical strength for that part, which is good because one of the two parts likely has to react some significant loads. However, certain plastics also have low thermal expansion coefficient and sufficient mechanical strength for use as the low expansion part. Obtaining the low thermal expansion coefficient with a plastics is possible by selecting a composition with an inherently small coefficient of thermal expansion and further adopting the common practice of mixing in glass fibers, which both strengthens the plastic and lowers its thermal expansion coefficient.

In regard to the high thermal expansion material, some plastics have coefficients of thermal expansion which are among the largest of any material. One such plastic is polytetrafluoroethylene (Teflon), which is manufactured by E. I. dupont de Nemours & Co. Among the various plastic materials, polytetrafluoroethylene has one of the larger coefficients of thermal expansion. It also has other good mechanical properties and a melting temperature well above the temperatures encountered in this device. Another similar fluoropolymer with a large thermal expansion coefficient is Neoflon PFA, a tetrafluoroethylene perfluorobinylether copolymer manufactured by Daikin America, Inc. Another candidate plastic with a fairly large thermal expansion coefficient would be a Nylon (polyamide) such as Nylon 12. The high expansion plastic would preferably be formulated with little or no fiber additive, since fiber additives generally decrease the thermal expansion coefficient. It would perhaps also be possible to make the high expansion part out of a metal which had a thermal expansion coefficient as different as possible from that of the low expansion part (for example, aluminum and Invar), but it would then probably be necessary to use many more sets of slots to achieve the required area. For metals the thermal expansion coefficient and more specifically the difference in thermal expansion coefficient among metals is not as large as is achievable when plastics together with metals are used. Still other materials might also be used for the movable parts whose relative motion provides the thermal valving. Perhaps the most likely combination of materials is polytetrafluoroethylene moving with respect to aluminum. The coefficient of thermal expansion of polytetrafluoroethylene, averaged over the temperature range $-40$ C. to $+90$ C., is $1.2E-4/C.$, while that of aluminum is $2.4E-5/C.$ For the temperature interval of 130 C., the thermal strain of polytetrafluoroethylene relative to that of aluminum is 0.012. A somewhat more complex but still very practical mechanism can be designed which relies more on absolute thermal expansion than on differential thermal expansion. It would involve circumferential expansion to cause rotation, or it would involve the linear thermal expansion of a long guided member (an actuator mechanism), relative to a fixed member which would be the guide, to position the movable valve member relative to the fixed member. This could particularly involve a coiled geometry of more than one turn so that the thermal expansion length increases with the number of turns, while the guide dimensions are unaffected by the number of turns.

All of the embodiments to be presented here provide two distinct flowpaths for gas exiting the stored gas region, which are fluid mechanically in parallel with each other. The first flowpath or noncompensated flowpath conducts gas out of the pressure vessel while substantially avoiding contact with the thermal reservoir element. The second flowpath or compensated flowpath conducts gas out of the pressure vessel such that it passes through the thermal reservoir element. In all of the embodiments, the principle is that at cold initial conditions a larger fraction of the exiting gas should go through the thermal reservoir element than does at hot initial conditions.

An underlying principle of this invention is that throughout the discharge transient, the position of the parts which make up the thermally responsive valve device should remain substantially what it was prior to the transient. This is what ensures that the degree of temperature compensation will be truly determined by the initial temperature of the inflator prior to discharge. It is true that the gas flowing through the thermally responsive valve device has a temperature which varies over the course of the transient, and the edges of the slots may experience some heat transfer with this gas. However, the design of the thermal valving parts does not provide unusually large surface area or make any other effort to promote heat transfer such as was done for the thermal reservoir element. As a result, it is believed that the thermal expansion parts do not undergo any significant change of relative position during the transient. Another factor which helps insure that the behavior to be governed principally by the pre-inflation conditions is the fact that during the transient there will be significant forces due to differential pressure which will tend to hold the parts by friction in the relative position which they occupied at the beginning of the transient.

The stored gas is preferably helium for several reasons. First, for any given temperature, helium has the highest speed of sound of any gas (other than hydrogen which is undesirable because, if released as stored gas, it could create a risk of flame in the interior of the vehicle). The high speed of sound helps to provide rapid discharge of the gas given the fact that there may be practical limitations on the areas of exit orifices. This is particularly important with the temperature dependent valving means described here which use thermal expansion, where the available motions and changes of areas are limited. Second, helium will not come close to its condensation point for the gas remaining inside the pressure vessel near the end of discharge, even for cold initial temperatures. Other gases such as nitrogen or argon could reach their condensation points during the later part of the transient for cold initial temperatures. Condensation of gas is undesirable because condensate is not useful for filling the airbag. Third, helium also has some advantage in terms of thermodynamic nonidealities related to its behavior upon throttling. Throttling of a gas (letting it flow through an orifice under a large pressure drop) is an isenthalpic process and for an ideal gas this involves no change of stagnation temperature of the gas. For real gases there can be an increase or decrease of temperature upon throttling. (This effect is separate from the previously described cooling due to decompression as a consequence of the first law of thermodynamics.) If the initial temperature of a real gas is somewhat close to its critical temperature (within a factor of two or so), then any small individual mass of gas cools upon throttling. This is true for gases such as argon and nitrogen in the temperature range of interest for stored gas inflators. More specifically, for argon and nitrogen, as the initial temperature decreases coming closer to the critical temperature, the cooling upon throttling becomes even larger. This combination of effects would exaggerate rather than diminish the difference in inflator output as a function of initial temperature. For helium, in the temperature range of interest for inflator operation, there is not significant spreading of the range of inflator output as a function of temperature. Fourth, yet another slight advantage of helium is that being monatomic it has a gamma of 1.67, in contrast to the gamma of 1.4 for diatomic gases such as nitrogen. (Gamma is the ratio of specific heat at constant pressure to specific heat at constant volume.) The larger gamma means that the cooling effect associated with decompression, which was described earlier using the first law of thermodynamics, is somewhat larger for helium than for nitrogen. This provides the opportunity to transfer a larger amount of heat back into the gas for the purpose of providing compensation. Finally, the use of helium also saves a modest amount of weight of the filled inflator. The use of helium does require that more attention be paid to sealing than would be required with other gases, but the problem of sealing is already dealt with in existing industrial processes which use helium. It is also possible that the stored gas might be a mixture of gases which contains a large proportion of helium for the reasons just given. It is possible that the remaining portion of the gas might be oxygen to lessen the asphyxiant nature of the released gas, or perhaps some other gas for some other reason. If most of the stored gas is helium, then most of the benefit of using helium will still be obtained.

Embodiment 1

This first embodiment is directed toward passenger side inflators as contrasted to driver side inflators. Those skilled in the art will appreciate that driver side or other applications such as side impact inflators can also be implemented using the technology described herein.

Figure 2A:
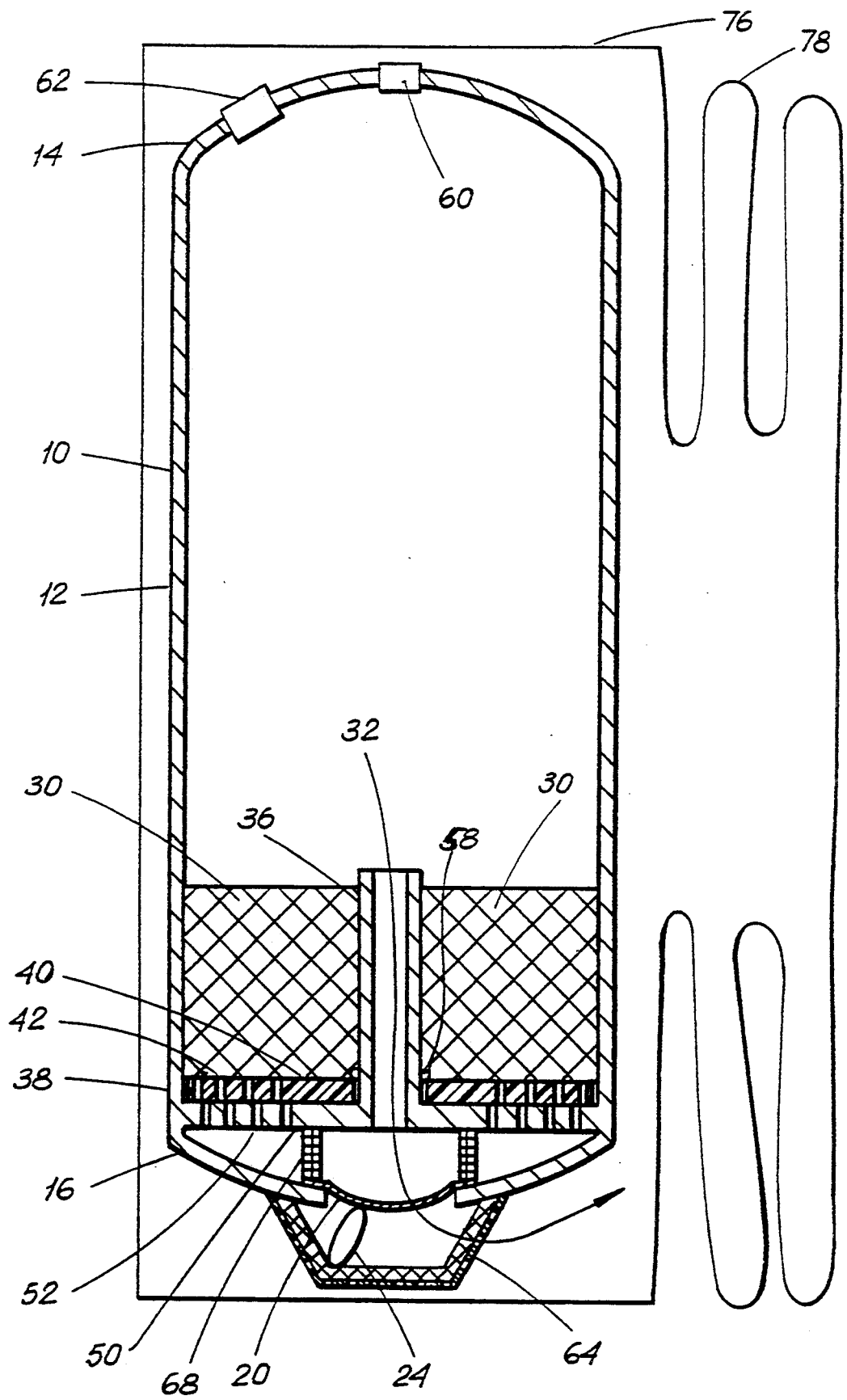
FIG. 2A is a longitudinal section view of the inflator coupled with a diffuser housing and airbag both shown schematically and having incorporated therein a temperature compensating valving system closing the flow of gas through a convective heat transfer network.
Figure 2B:
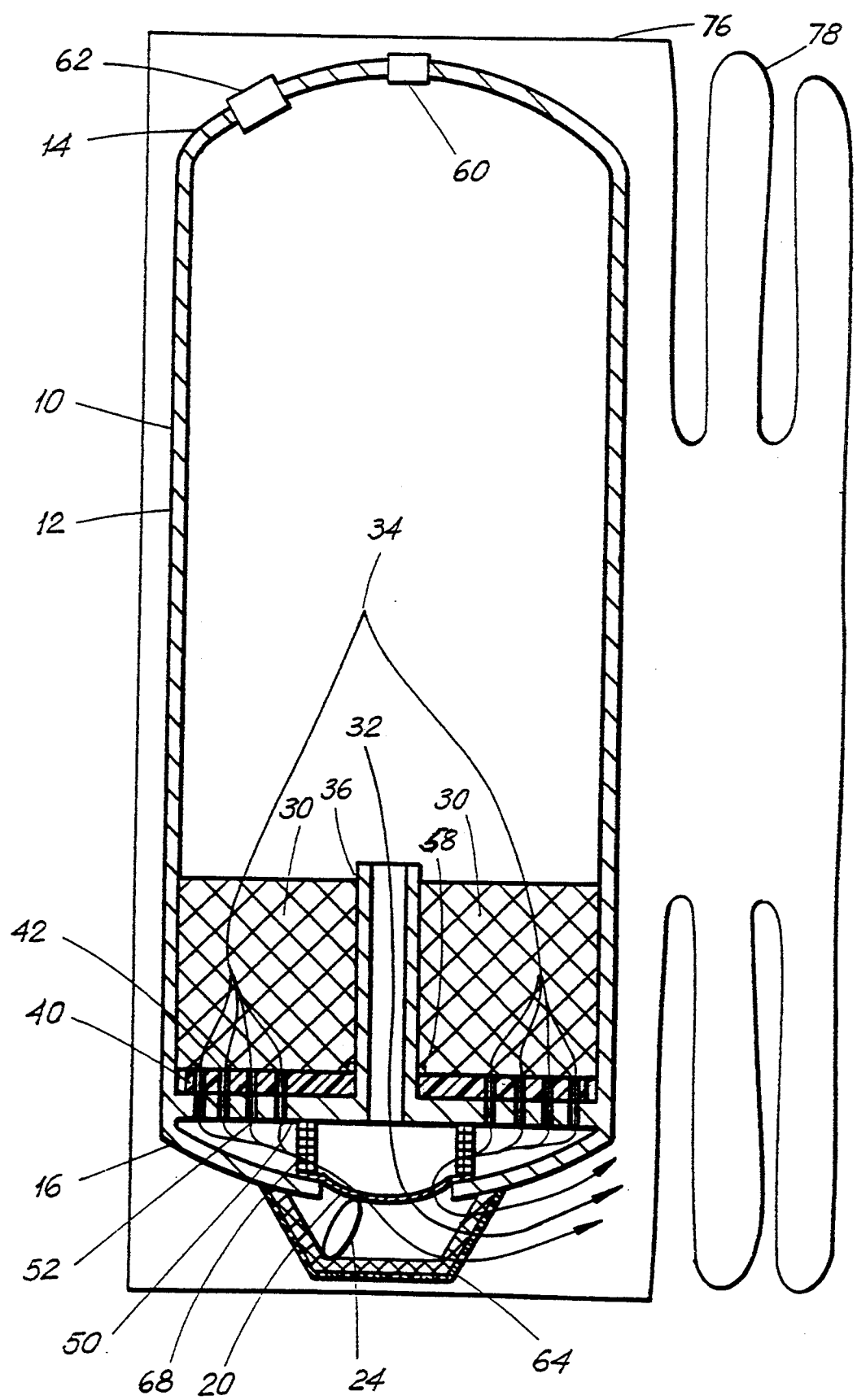
FIG. 2B is a similar view with the valving system open.

FIG. 2 shows this first embodiment. FIG. 2A shows the device as it would appear at hot initial conditions, while FIG. 2B shows the device as it would appear at cold initial conditions. Again, for clarity of illustration, the slot widths and thermal motion distances are shown out of scale and exaggerated. This embodiment comprises a generally cylindrical pressure vessel 10 comprising a cylindrical portion 12, a closed end cap 14 at one end, and at the other end an end cap 16 disposed to receive a sealing means 20 such as a rupture disc or rupturable wall. The end caps 14 and 16 may be semiellipsoidal or hemispherical or of a similar shape. Also shown is a means, 24, for inducing rupture of the rupturable wall 20 upon signal as previously discussed. In a vehicular airbag application, the signal would come from a crash sensor. This initiating means 24 is shown as being on the outside of the pressure boundary and may be of a pyrotechnic nature as is known in the art. Included in the pressure vessel is a port, 60, through which the pressure vessel can be filled and which can then be sealed. Also included, optionally, is a pressure monitor or sensor, 62, so that any possible leakage of gas out of the pressure vessel during long-term storage can be detected. The pressure monitor 62 should additionally include a temperature monitor because in order to interpret a pressure reading and determine whether any gas has leaked out, it is necessary to know the temperature of the gas whose pressure was measured. Also shown is a small amount of filter mesh and associated support structure, 64, disposed immediately downstream of the rupturable wall 20, which may be used to catch fragments. Depending on the details of the rupturable wall 20 and the device 24 for initiating rupture of the rupturable wall, such a device may be needed to assure that no fragments of the rupturable wall or of the initiating device can enter the airbag. Also shown is a housing or diffuser or duct device, 76, to direct the flow of the gas from the inflator exit to the airbag. Finally, the airbag 78 is shown.

In this embodiment, the thermal reservoir element 30 is located inside the pressure vessel 10. The thermal reservoir element 30 is preferably of an annular shape, having an outside diameter essentially equal to the inside diameter of the cylindrical portion 12 of pressure vessel 10. It is advantageous to use the full inside diameter of the pressure vessel, and most of the cross-sectional area of the vessel, so as to provide the largest possible flow cross-sectional area, which minimizes pressure drop for flow through the mesh and thereby helps achieve a large flow fraction through the mesh at cold conditions, good heat transfer, and a fast time constant of discharge. It is also desirable that the thermal reservoir element 30 occupy only a relatively small portion, say 20% to 30%, of the overall length of pressure vessel 10, as shown. The thermal reservoir element can be sized as described earlier. Typical parameters would be aluminum wire, 0.010 inch diameter, 25% dense, and 140 grams. There is not a critical dependence on any of these parameters.

FIG. 2B also shows two distinct flowpaths for gas exiting the stored gas region. The second flowpath or compensated flowpath, 34, conducts gas out of the pressure vessel such that it passes through the thermal reservoir element 30. The first flowpath or noncompensated flowpath, 32, conducts gas out of the pressure vessel while substantially avoiding contact with the thermal reservoir element 30. The flow through the second flowpath is governed by temperature-dependent valving, while the flow through the first flowpath is not. Accordingly, this embodiment can be referred to herein as a singly-valved embodiment.

In this first embodiment, the thermal motion is in the radial direction with respect to the principal axes of the generally cylindrical pressure vessel 10. The temperature-dependent valving element comprises a first disc or slidable disc 40 made of a first material having a first coefficient of thermal expansion, and a second disc or structural disc 50 made of a second material having a second coefficient of thermal expansion. FIG. 2 is drawn as showing a more upstream disc, which is referred to as the slidable disc 40, and a more downstream disc which is referred to as the structural disc 50. In this way, when pressure difference occurs across the valving device, the slidable disc is structurally supported by the structural disc. The slidable disc 40 is attached to structural disc 50 by anchor means 58 which is preferably located at the center of discs 40 and 50. In addition to fastening the discs to each other, anchor means 58 maintains the discs concentric with each other. Preferably anchor means 58 also sets the relative angular position of the discs 40 and 50 so that the slots maintain proper relative position.

One of discs 40 and 50 is the high expansion disc and the other is the low expansion disc. If one of the materials is plastic and the other metal, it is likely that the metal is stronger than the plastic, which means that the structural disc 50 is preferably made of the metal and the slidable disc 40 is made of the plastic. In this case, the slidable disc is likely to be the high expansion disc. However, the slidable disc could also be the low expansion disc, particularly if the slidable disc were made of Invar.

Structural disc 50 is shown in the drawings as being connected to pressure vessel 10, but, however, it may be a separate part, with a seal being formed against the wall of pressure vessel 10 by O-ring (not shown) disposed in the outer edge of disc 50. Structural disc 50 may have a support structure 68 or similar means to contact with the dome 16 at the discharge end of the pressure vessel, in order to transfer to the dome load which is exerted on structural disc 50 during the discharge transient due to pressure differences. At the same time, however, support structure 68 must be intermittent or contain holes, such that the flow in flowpath 34 can reach the exit port in dome 16, in which rupture disc 20 is mounted. The design details of support structure 68 are related to the design details of dome 16. Support structure 68 could be integrally connected to structural disc 50, or it could be a separate part, depending on a designer's preference.

As described here and illustrated in FIG. 2, the valving is located downstream of the thermal reservoir element 30. This is convenient in terms of load paths for structural reasons, and also for assembly. However, if desired, the valving could instead be placed upstream rather than downstream of the thermal reservoir element 30, provided that suitable separation of the flowpaths is maintained everywhere downstream of the valve.

In order that the flow area where flowpath 32 passes through discs 40 and 50 be independent of temperature, the holes 46 in one of the discs, preferably the more upstream disc 40, are larger than the holes 56 in the other disc 50, preferably the more downstream disc, by more than the amount of any relative motion of the two discs. This insures that the uncompensated flow is determined by the area of the set of the smaller of these holes and is unaffected by any relative motion of the two discs.

Figure 2C:
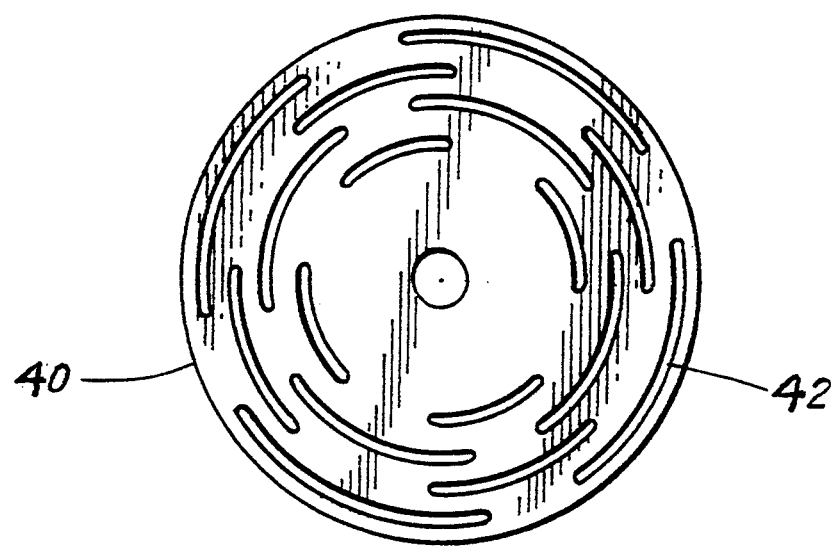
FIG. 2C is a perspective cutaway view of the discs showing the arrays of slots.

There are provided a plurality of slots 42 disposed in disc 40 and a plurality of slots 52 disposed in disc 50. For the embodiment of FIG. 2, two different positions are shown in FIG. 2A and FIG. 2B. Slots 42 and 52 are disposed so that at hot conditions the slots substantially cover each other and provide no opportunity for the gas to exit through them. This relative position of the slots is illustrated in FIG. 2A. For this reason, in FIG. 2A there is not shown an exiting flowpath 32. Slots 42 and 52 are also disposed so that at cold conditions the slots substantially align with each other. This relative position is shown in FIG. 2B. It provides the governing flow area in flowpath 32. As shown in FIG. 2C, the slots are arcs of circles, centered at the center of the disc (the axis of symmetry of the cylindrical geometry), and occupying the circumference intermittently. It is desirable that the arcs occupy as much as possible of the circumference to provide as much area as possible. However, the arcs must leave enough uncut material for the whole disc to remain connected. In the example shown, each of the four individual arcs at a given radius occupies approximately 45 degrees of arc, so that for any given radius of arc the total angular extent of the individual arcs at that radius is approximately half of the circumference. In order to achieve sufficient valved flow area, it is probably necessary to have more than one set of arcs, even if the materials have the largest possible difference in thermal expansion coefficient. In the example, sets of arcs at four different radii are used, in order to achieve sufficient perimeter of the arcs or length of slots. If the two materials were two different metals, even more sets of arcs would be necessary.

In the radial expansion axisymmetric geometry shown in FIG. 2, it is advantageous for two reasons to have the arcs at as large a radius or radii as possible, although the available radius is of course limited by the assumed dimensions of the inflator cross-section. First, the actual distance of thermal motion is the differential thermal strain times the radial distance away from the center of the disc. Second, the circumference of a circle also increases directly with its radius, and the total arc length which can be used for slots (without unduly weakening the disc) is some fraction of this circumference. Thus, the valved area available from a set of slots at any particular radius is a quadratic function of its radius. In the present example, to achieve the desired fully open flow area, four sets of slots at uniformly spaced radii were used. However, the outer slots contributed much more to the total area than did the innermost. In the example the radius of the largest arc is 38 mm (1.5 inch) and the radii of the other arcs are correspondingly smaller. The thermally variable area which is achieved by this means is greater than $1.E-4$ $m^2$, which is fully open at cold conditions and fully closed at hot conditions.

As mentioned, for Embodiment 1 the noncompensated flowpath is always open. In this example the always-open area of the noncompensated flowpath 32 is O.S E-4 0.5 $m^2$. With this being the case, it would never be possible to direct all the exiting flow through the compensated flowpath 34. However, for practical reasons it is best if at cold conditions a substantial fraction of the exiting gas goes through the compensated flow path, say at least half and preferably as much as two-thirds of the flow. This is one reason why in this embodiment the flow area of the thermal valve when fully open is several times as large as the flow area of the always-open uncompensated flowpath.

As has been seen, the distance of thermal motion in this embodiment, 0.015 inch and less, is rather small. It is preferable (although not necessary) that the structural disc 50 has slots 52 whose width is the distance of thermal motion. (The widths of slots 52 for the four different sets of slots then is preferably not uniform but rather increases with radius as the distance of relative thermal motion increases with radius.) The outer edge of each slot 52 serves a valving function and a support function, while the inner edge serves a support function. In this way, the slidable disc 40 is everywhere well supported from downstream and the maximum cantilever distance for the material of the slidable disc would only be the width of the slots 52 in structural disc 50. The slots 42 in the slidable disc 40, on the other hand, can be wider than the distance of thermal motion, because only the inner edge of each slot serves a valving function. Such a wider slot might be convenient for the manufacturing of the slidable disc 40, but for simplicity of illustration, the slots 42 are shown as being of the same width as the slots 52 with which they interact. The slidable disc 40, which may be made of polytetrafluoroethylene, may have a thickness which is as much as five or ten times as large as the distance of cantilever over the slot, a fact which makes up for the limited mechanical strength of the plastic material likely to be used for slidable disc 40.

A typical storage pressure would be 27 MPa (4000 psi) to 41 MPa (6000 psi) at the hot temperature extreme. If this embodiment is designed for use on the passenger side of a vehicle, where the required volume of the airbag is typically 150 liters, the mass of stored helium would be approximately 50 grams. The inside diameter of the pressure vessel could be 82.5 to 90 mm (3.25 inch to 3.5 inch), with a corresponding length for the mass of gas. The pressure vessel could be made of high strength steel or stainless steel. The rupturable wall may be a rupture disc such that rupture of the rupture disc results in an open passage of diameter approximately 2 cm to 2.5 cm.

For the example dimensions given here, calculations indicate that at cold initial conditions approximately two-thirds of the flow should be going through the thermal reservoir element.

Embodiment 2

Figure 3A:
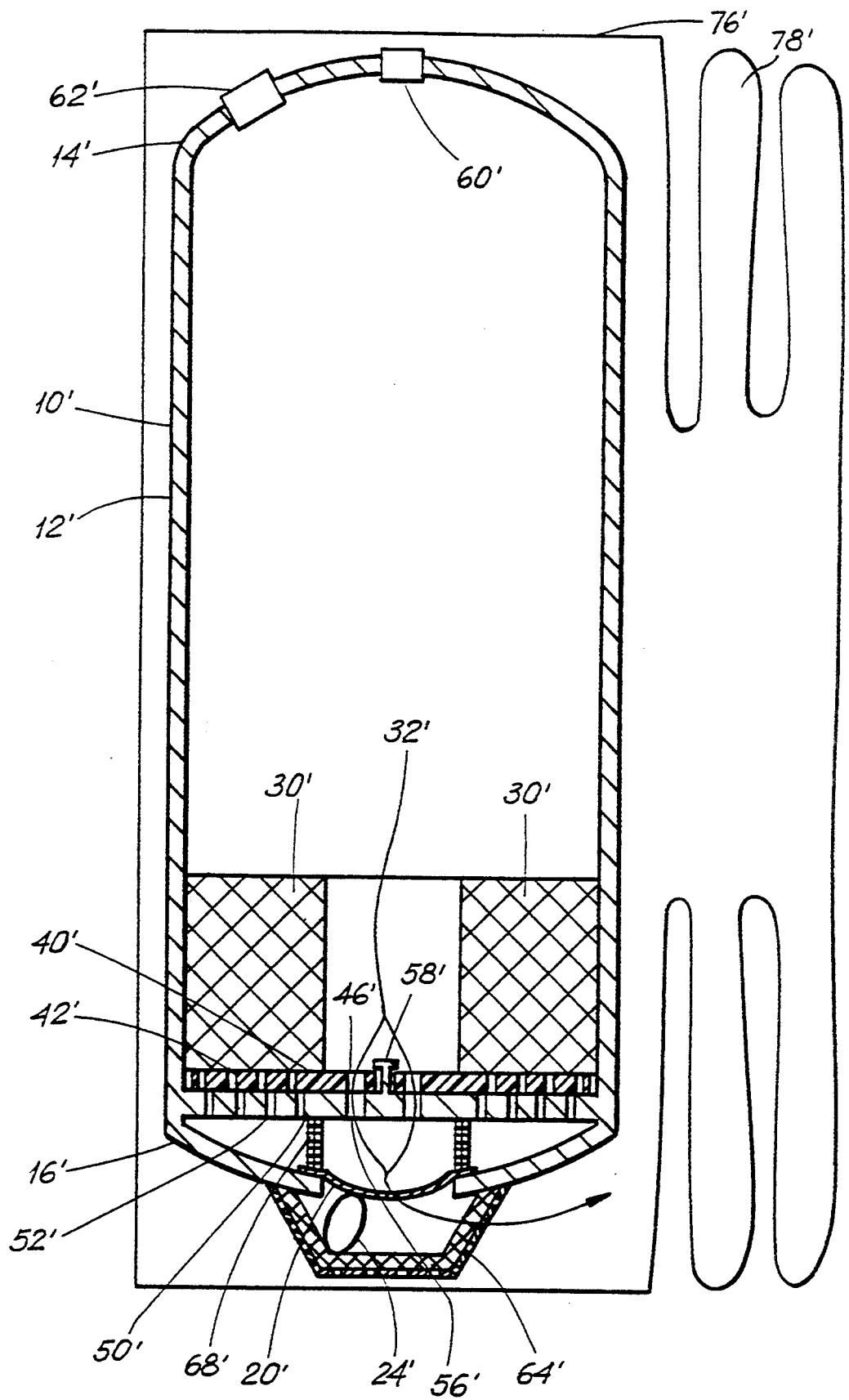
FIG. 3A is a view similar to FIG. 2A utilizing a second embodiment of temperature compensating valving system shown in its closed position.
Figure 3B:
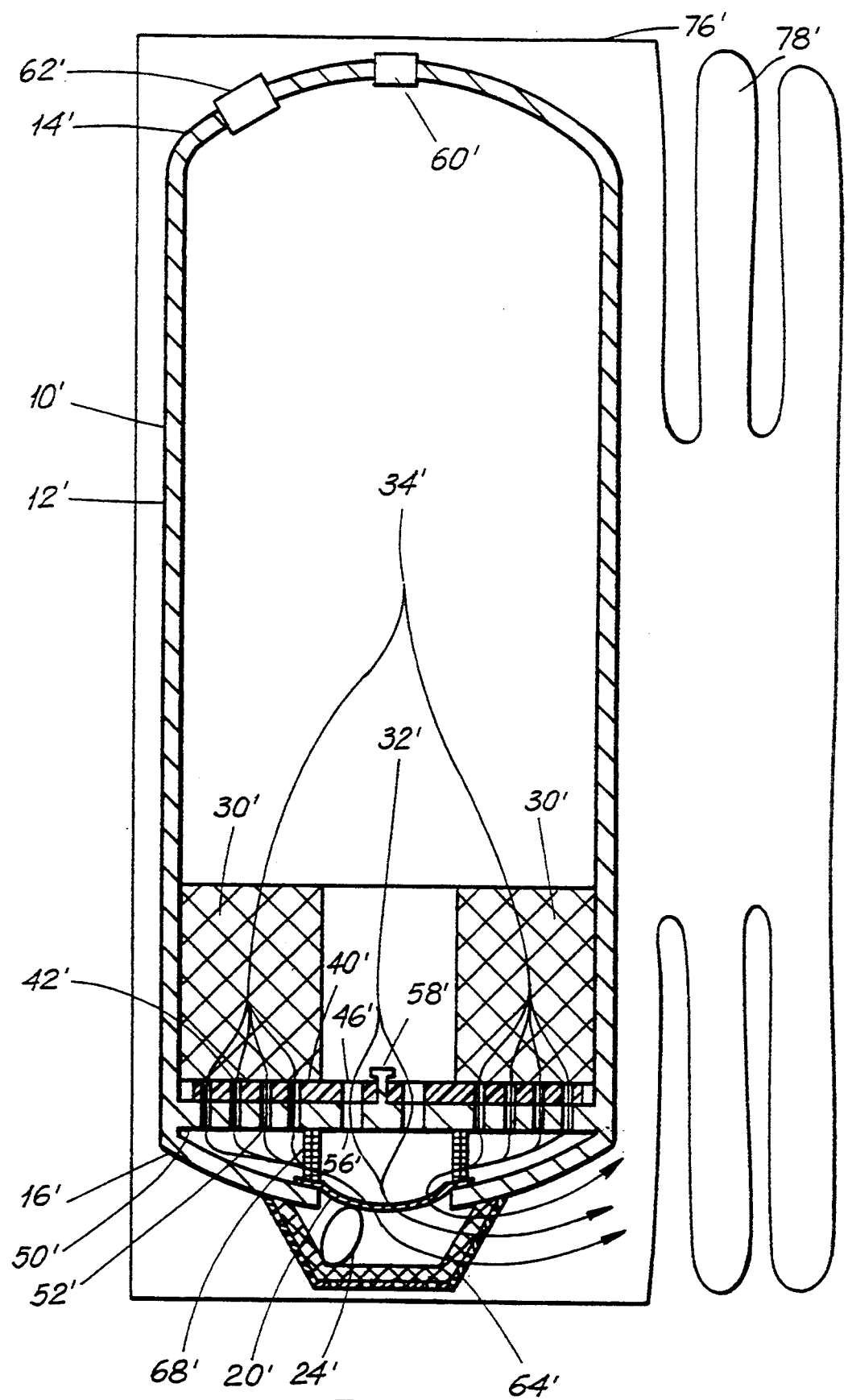
FIG. 3B is a similar view with the valving system of FIG. 3A open.

In FIGS. 2A and 2B, the noncompensated flowpath 32 passes through the center of the annular mesh 30 by means of tube 36, which serves as a boundary to keep flowpaths 32 and 34 physically separated from each other (unmixed). However, it is possible to eliminate tube 36, resulting in design simplification, as shown in FIGS. 3A and 3B. FIG. 3A shows the inflator at hot initial condition, and FIG. 3B shows the inflator at cold initial condition. All corresponding parts in FIG. 3 are denoted with a prime. As shown in FIG. 3, the inside diameter of the annularly-shaped thermal reservoir element 30' may be of a sufficient size that it bears a certain relationship to some internal flow patterns. The noncompensated flowpath 32' passes through a set of holes 46' and 56' in discs 40' and 50' which are preferably located as close as possible to the center of these discs. The goal is that the flow pattern by which gas is drawn into these holes, which is the opposite of a jet, should take in gas from the generally open region inside the pressure vessel without causing much of that gas to flow through the mesh. To this end, the inside diameter of the annularly-shaped thermal reservoir element 30' may be roughly equal to or somewhat less than the axial extent of the thermal reservoir element. In this respect it is also desirable that the axial extent of the thermal reservoir element be modest, no more than 20% to 30% of the axial length of the vessel. The combination of these two features results in a situation wherein at high initial temperature, where only the noncompensated flowpath is open and contact by the gas with thermal reservoir element 30' is not desired, most of the gas can exit the inflator without having any thermal contact with thermal reservoir element 30' and possibly only relatively small amounts of gas near the edges of the intake flow pattern, as well as the relatively small portion of the gas which initially occupied the interstices of the thermal reservoir element, actually have thermal contact with the thermal reservoir element. The performance is found to be almost the same as for the device as shown in FIG. 2.

The time constant or discharge time of the inflator is governed in part by the exit areas in the two flowpaths such as 32 and 34 or 32' and 34'. One of these, the compensated flowpath area, varies as a function of initial temperature, and the other, the uncompensated flowpath area, is set during manufacturing. The speed of discharge of the inflator can be adjusted by adjusting these areas. A feature of the performance of the inflator as described in this design is that the time constant of discharge is somewhat different for the various temperature situations, because the total exit area is larger for the cold initial temperature than for the hot initial temperature. This can be considered beneficial in narrowing the performance band, depending on how one looks at performance. A typical duration of a crash is 70 ms, with some variation among vehicles depending on the structural design of the front of each vehicle. In this set of performance curves, the curve for cold initial conditions essentially reaches its asymptote by 70 ms into the crash. This is helpful in maximizing the inflation of the bag for cold initial conditions. At the hottest initial conditions, the receiving tank pressure trace is such that at 70 ms the asymptote has not quite been reached. It may be that the time after 70 ms, during which the last 10% or so of gas is discharged, could be considered irrelevant because the accident is over by then anyway. If that is so, for hot initial conditions, discharging slightly less than all of the gas during the time of interest, while at cold initial conditions discharging essentially all of the gas during the time of interest, helps to narrow the performance band.

A further observation is that this same effect is present even if temperature-dependent valving is used in the absence of a thermal reservoir element. The benefit is not as great because the total output (final asymptotic value) will be approximately proportional to absolute temperature as described earlier, but during the time of interest the separation between the curves for various initial temperatures will be less severe than that. Thus, an embodiment resembling Embodiment 2 but with thermal reservoir element 30 completely absent would still have some narrowing of the performance band if the time of interest is limited to a value less than the slowest discharge time at hot initial conditions.

Embodiment 3

This embodiment is similar to Embodiments 1 and 2, except that a second temperature-dependent valving device is also used, this one to control the noncompensated flow. An inflator with this feature is referred to herein as doubly valved. Compensation is improved if in addition to opening up the flow through the thermal reservoir element as temperature decreases, there is also a closing off of the noncompensated flow. In this way, at the extreme cold temperature all of the gas can be compensated instead of only approximately two-thirds of the gas as occurs in Embodiments 1 and 2. As a result, the width of the temperature band would be even narrower than for embodiment 1.

Figure 4A:
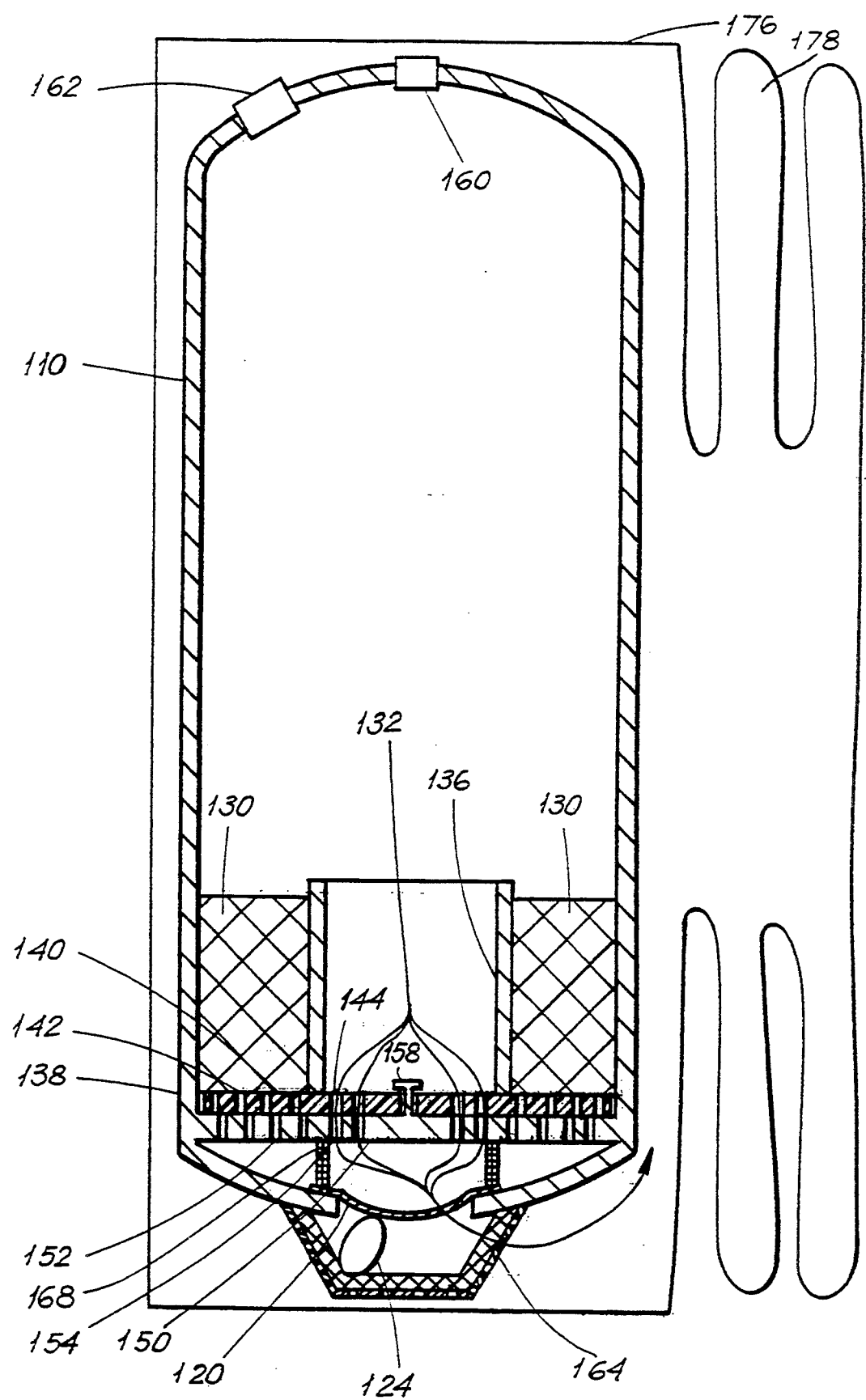
FIG. 4A is a view similar to FIG. 2A utilizing a third embodiment.
Figure 4B:
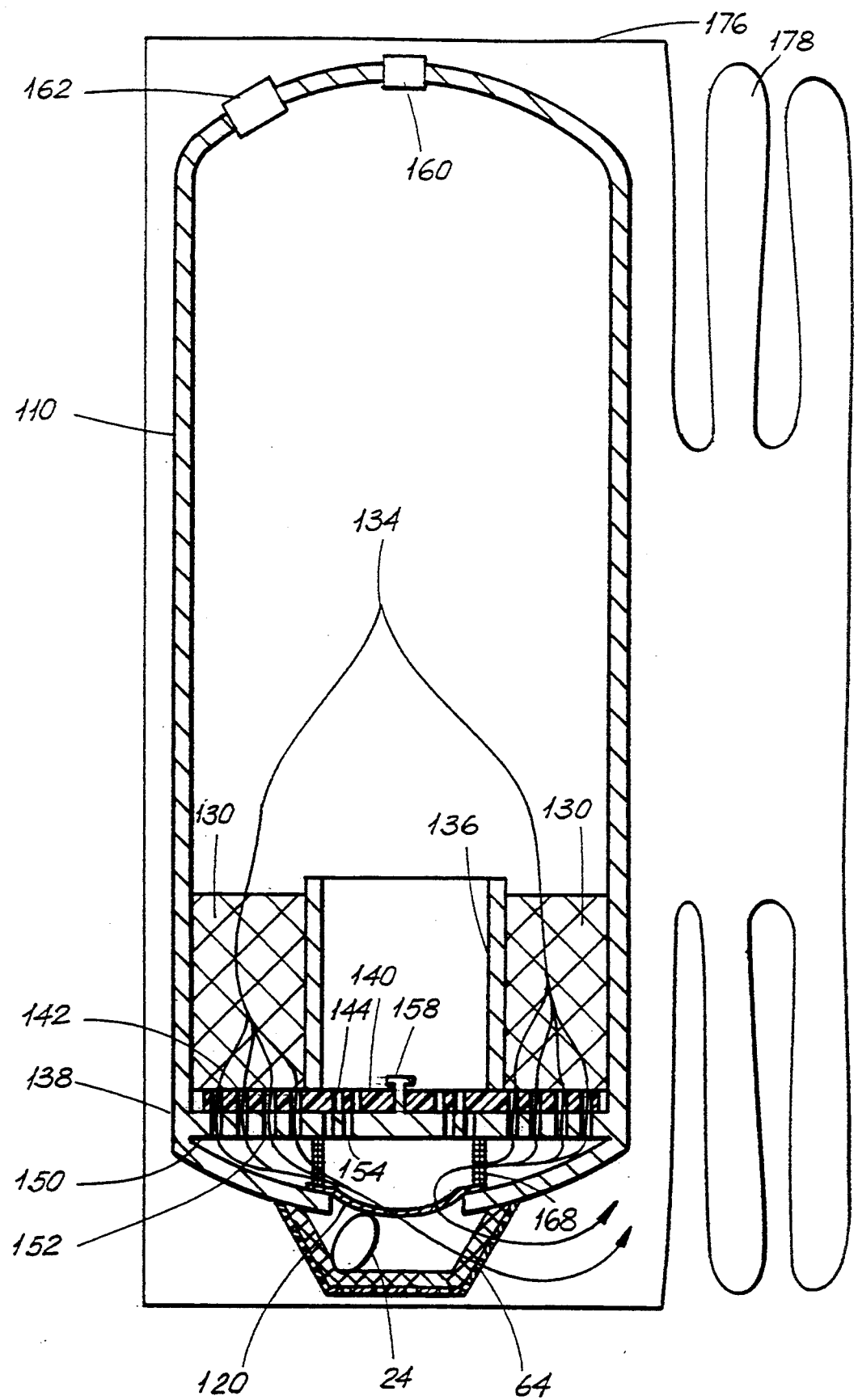
FIG. 4B is a similar view with the valving system of FIG. 4A.

This embodiment is shown in FIG. 4. FIG. 4A shows the configuration at hot conditions, and FIG. 4B shows the configuration at cold conditions. The components numbered previously for embodiment 1 are similarly numbered in this embodiment, increased by 100.

The second valving device takes the form of a second set of slots, in the uncompensated flowpath 132, which move past each other due to differential thermal expansion. These slots are slots 144 in disc 140 and slots 154 in disc 150. Slots 144 and 154 are arcs of circles centered at the central axis of the inflator and of the discs 140 and 150, as are slots 142 and 152. In this embodiment, as in Embodiments 1 and 2, flowpath 134 for compensated flow is disposed such that the gas exiting the pressure vessel flows through both thermal reservoir element 130 and the valving action created by slots 142 and 152. Unlike Embodiments 1 and 2, in this embodiment, flowpath 132 for noncompensated flow is such that the gas exiting the pressure vessel does flow through valving action (created by slots 144 and 154) while it is bypassing the thermal reservoir element 130. The use of two temperature-dependent valving means does require a precise dimensional relationship between the areas so that one of the areas decreases while the other increases.

In order to provide sufficient valved area in the uncompensated flow path, by means of differential thermal expansion using slots 144 and 154, it is necessary to have the slots located at a sufficiently large radius, because of the dependencies of available area on radius noted earlier. Thus, FIG. 4 shows the inner radius of thermal reservoir element 130 moved to a larger radius than was shown in FIG. 2. FIG. 4A shows the configuration of the device at the hot initial condition, and FIG. 4B shows the configuration of the device at the cold initial condition. At the hot initial condition, the valve formed by slots 142 and 152 is closed and the valve formed by slots 144 and 154 is open, thereby forcing all of the exiting gas to use noncompensated flowpath 132. At the cold initial condition, the valve formed by slots 142 and 152 is open and the valve formed by slots 144 and 154 is closed, thereby forcing all of the exiting gas to use compensated flowpath 134. This embodiment would have an output whose variation with temperature would be smaller than for the corresponding inflator designed according to Embodiments 1 and 2.

Embodiment 4

Figure 5A:
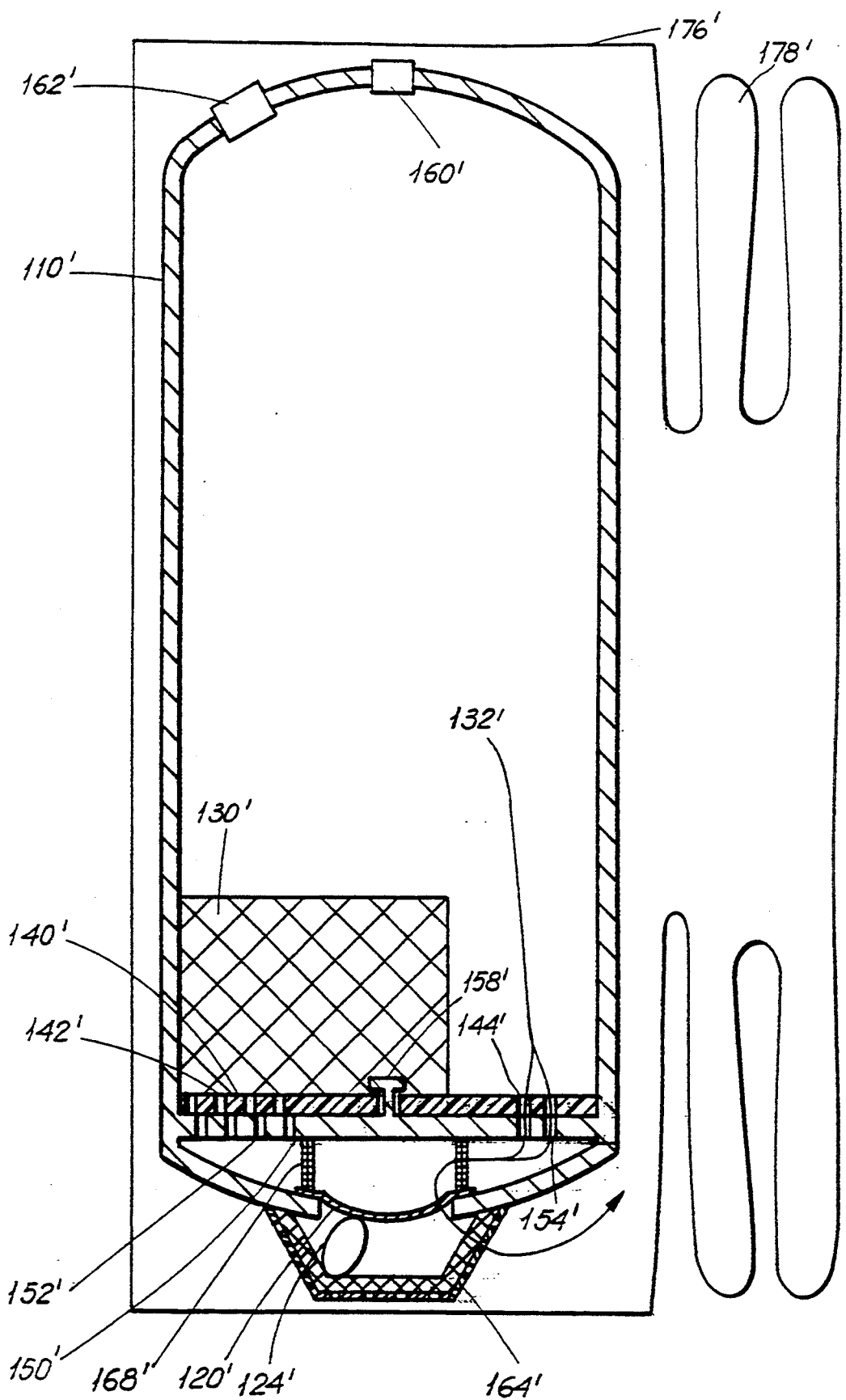
FIG. 5A is a view similar to FIG. 2A utilizing a fourth embodiment of temperature compensating valving system shown in its closed position.
Figure 5B:
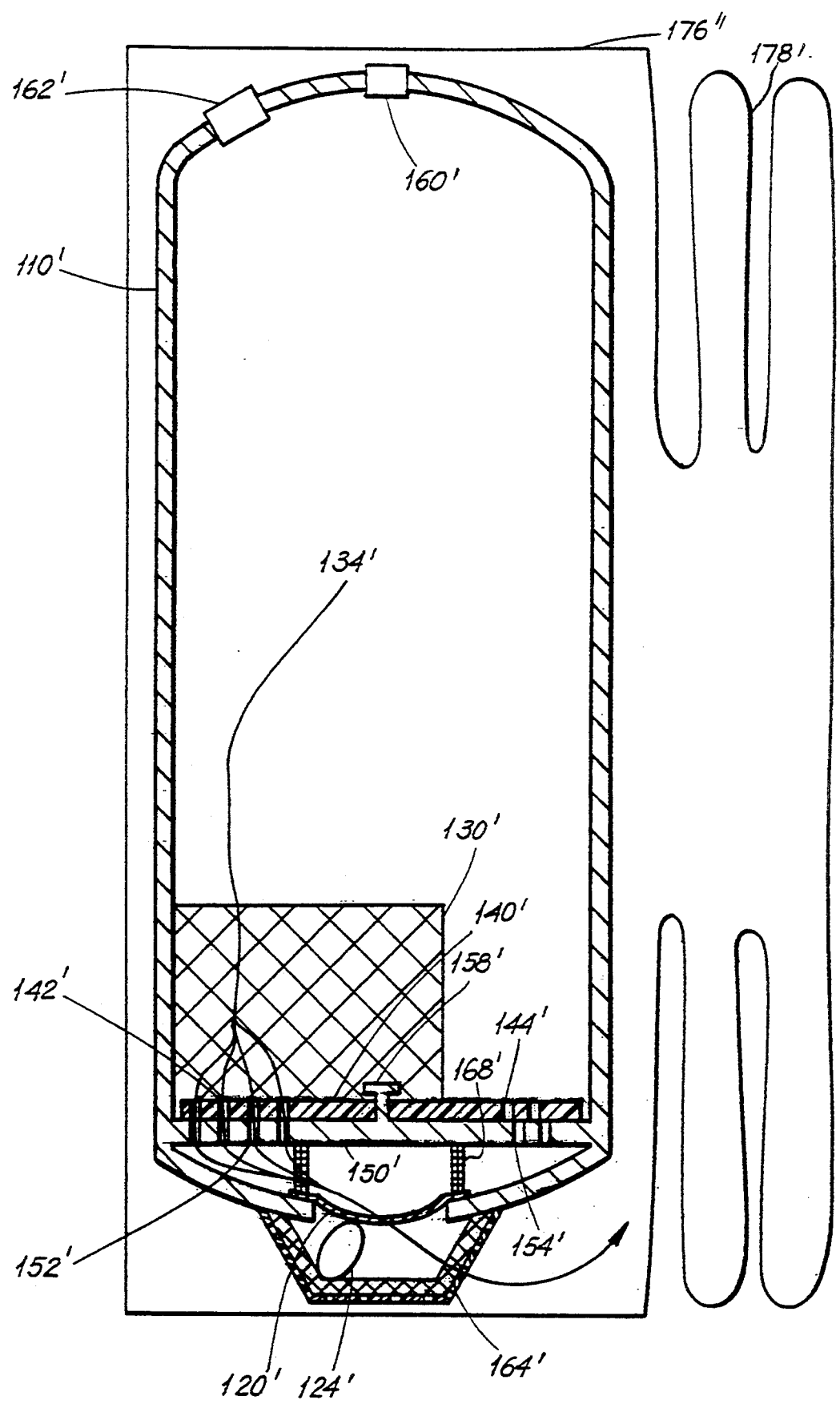
FIG. 5B is a similar view of the valving system of FIG. 5A.

A slightly different way of accomplishing the Embodiment 3 is shown in FIG. 5A and 5BD, with corresponding parts denoted by prime. In this figure for the thermal reservoir element 130' no longer occupies a full 360 degrees axisymmetrically, but rather occupies a fraction more than 180 degrees but less than 360 degrees, perhaps 240 degrees as shown here. The noncompensated flowpath 132' passes through the region not occupied by the thermal reservoir element 130', while the compensated flowpath 134' as usual passes through the thermal reservoir element 130'. The relative radii of slots are such that at hot initial conditions as shown in FIG. 5A, the valving action formed by the slots 144' and 154' in the region of the noncompensated flowpath 132' opens while the valving action formed by the slots 142' and 152' in the region of the compensated flowpath 134' closes. At cold initial conditions as shown in FIG. 5B, the reverse happens, namely the valving action formed by the slots 144' and 154' in the region of the noncompensated flowpath 132' closes while the valving action formed by the slots 142' and 152' in the region of the compensated flowpath 134' opens.

Embodiment 4 as with Embodiment 3 is considered a doubly-valved inflator, and Embodiments 1 and 2 is considered a singly-valved inflator with the valving on the noncompensated flowpath. There is one further possibility, namely, a singly-valved inflator whose valving is on the uncompensated flowpath and whose compensated flowpath is always open. This could be constructed in ways analogous to those just presented.

Embodiment 5

The radial direction of direct thermal expansion motion, utilized in Embodiments 1 to 4, is not the only possible direction of direct thermal expansion motion which could be used for valving. It is also possible to use direct thermal expansion in the axial direction, as presented in this embodiment, Embodiment 5. This embodiment is a singly-valved embodiment.

Utilizing axial thermal expansion involves installing the thermal reservoir element inside a tube or enclosure which is inside the pressure vessel but is smaller than the pressure vessel inside diameter. On the outside of this tube would be a sliding sleeve made of material with a different thermal expansion coefficient.

Figure 6A:
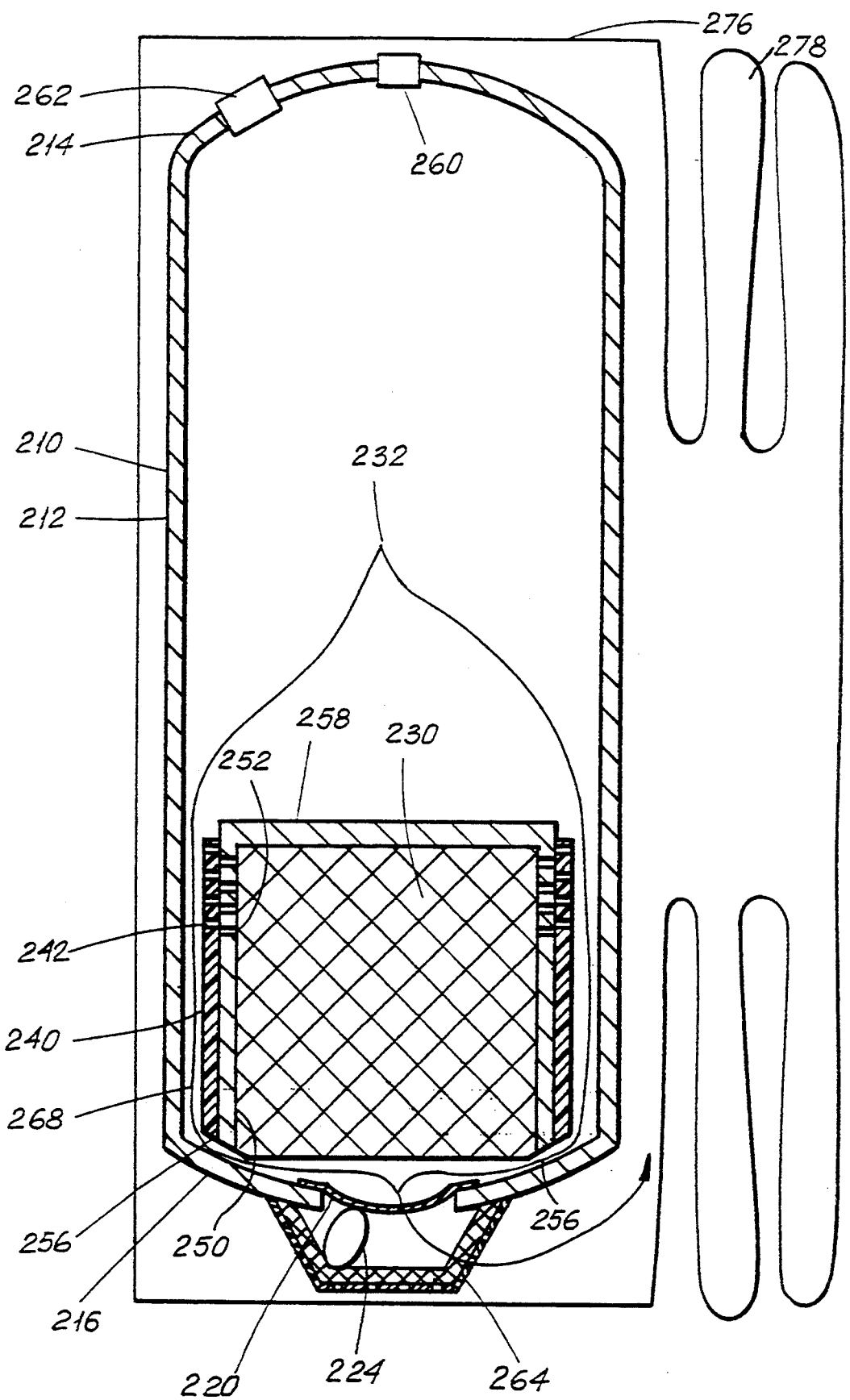
FIG. 6A is a view similar to FIG. 2A utilizing a fifth embodiment of temperature compensating valving system shown in its closed position.
Figure 6B:
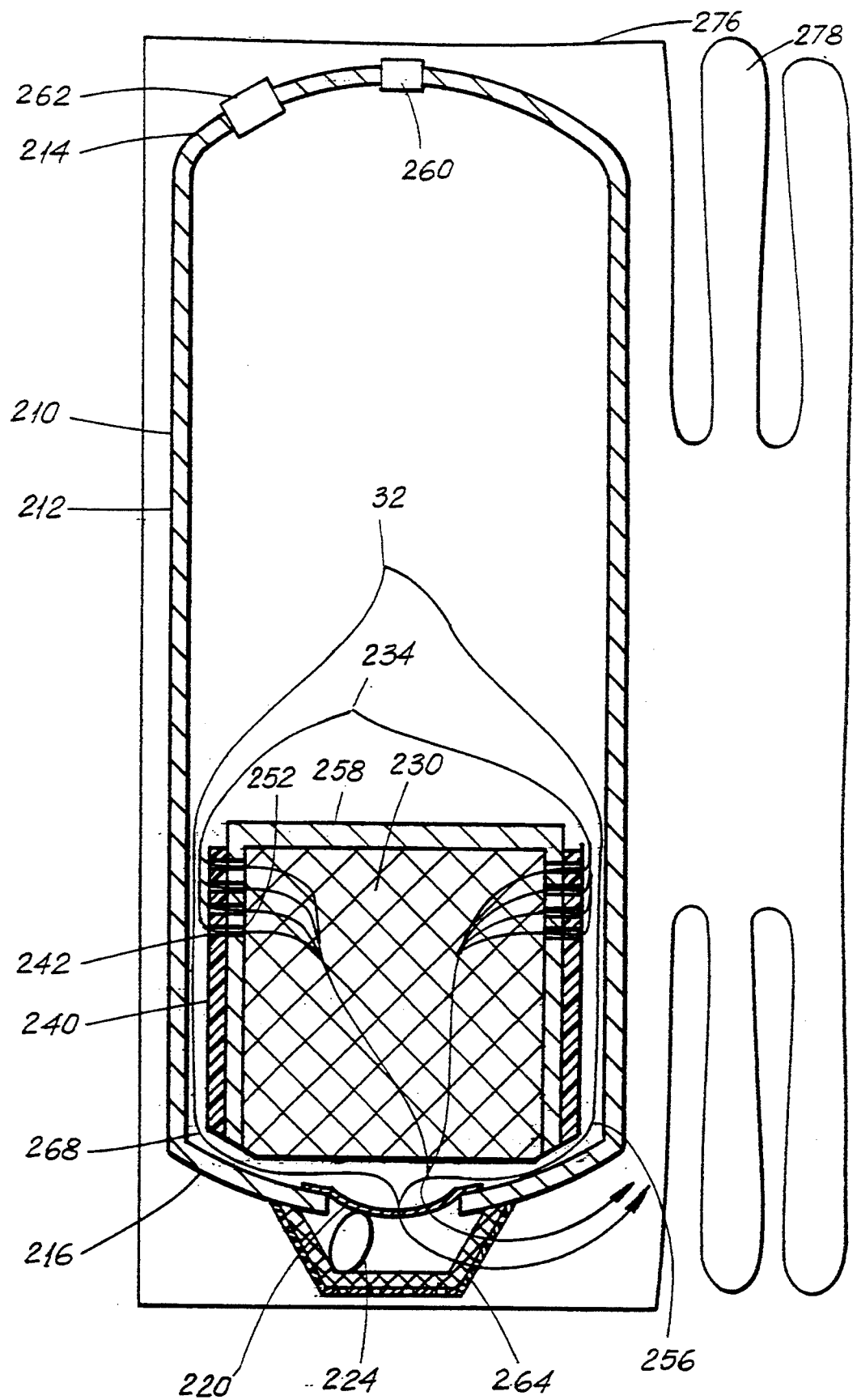
FIG. 6B is a similar view of the valving system of FIG. 6A open.
Figure 6C:
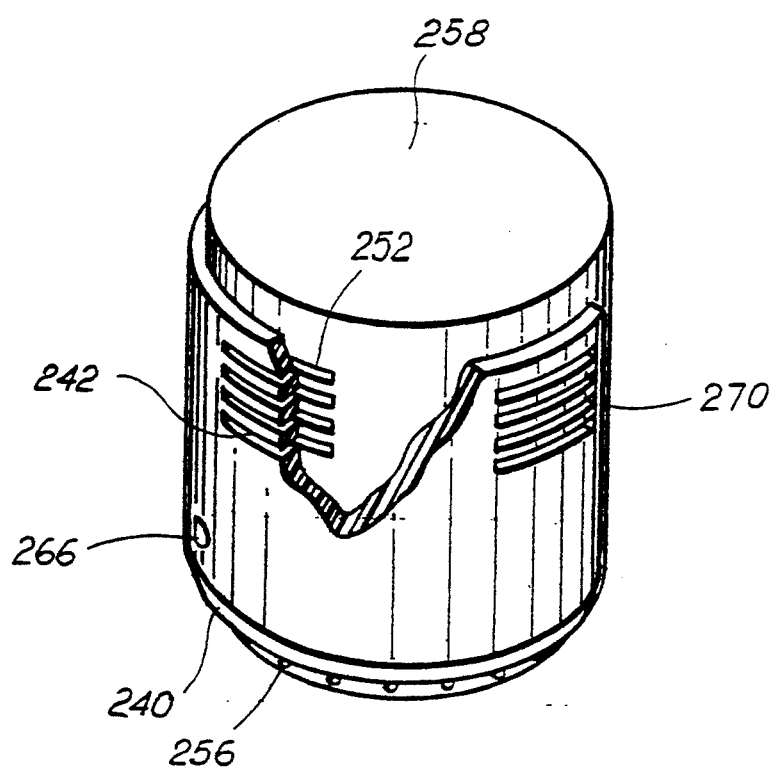
FIG. 6C is a perspective cutaway view of the sleeves showing the array of slots.

This embodiment is shown in FIG. 6. FIG. 6A shows the configuration at hot conditions, and FIG. 6B shows the configuration at cold conditions. Part numbering follows the earlier pattern, this time using numbers in the 200's. Similar to earlier embodiments, this embodiment comprises a generally cylindrical pressure vessel 210 comprising a cylindrical portion 212, a closed end cap 214 at one end, and at the other end an end cap 216 disposed to receive a sealing means such as a rupture disc or rupturable wall 220. It also comprises a means, 224, for inducing rupture of the rupturable wall 220 upon signal from a crash sensor.

The embodiment also comprises a thermal reservoir element 230, which is contained inside a tube 250. Thermal reservoir element 230 is of a generally cylindrical shape, having an outside diameter which is essentially equal to the inside diameter of tube 250. Thermal reservoir element 230 and tube 250 are both contained inside pressure vessel 210. Tube 250 is structurally connected at the lower end to end cap 216 of pressure vessel 210. At its other end, tube 250 is covered by cap 258. There is provided a noncompensated flowpath 232 which exits the pressure vessel without passing through either thermal reservoir element 230 or any form of valving. Noncompensated flowpath 232 preferably comprises a set of slots or holes 256 drilled through the base of tube 250 near the place where tube 250 joins end cap 216, preferably downstream of the thermal reservoir element 230. Holes 256 are always open (see FIG. 6C). There is also provided a compensated flowpath 234, which exits the pressure vessel so as to pass through both valving and the thermal reservoir element 230.

Valving is provided by the dissimilar behavior of tube 250 and split sleeve 240, which is disposed around the outside of tube 250. Tube 250 is made of a first material having a first coefficient of thermal expansion, and sleeve 240 is made of a second material having a different coefficient of thermal expansion. By analogy with earlier embodiments, tube 250 provides structural support for sleeve 240 against pressure differences which occur during the discharge transient, and may be made of a metal, such as aluminum. By analogy with earlier embodiments, sleeve 240 may be made of polytetrafluoroethylene or a similar material with a large thermal expansion coefficient. Sleeve 240 is free to slide relative to tube 250 except that is anchored to tube 250 at one point, which must be at the end of the tube near end cap 216.

Disposed in tube 250 near the end farthest from end cap 216 is a set of slots 252. Also disposed in sleeve 240 near the end farthest away from end cap 216 is another set of slots 242. Both of these sets of slots are near the end farthest from end cap 216 because the anchor location where tube 250 and sleeve 240 are connected to each other such as by rivet 266 close to end cap 216. Thus, the entire distance between the anchor location and the set of slots is available to generate thermal expansion motion. This distance might typically be 75 to 100 mm (3 or 4 inches), which is greater than the radial distance which was available to generate thermal expansion motion in the radial expansion designs of embodiment 1 and embodiment 2. Also, in the axial expansion design, it is possible to provide a plurality of rows of slots 242 and 252, with all of the rows having the same total slot length and roughly the same amount of thermal expansion. These two considerations probably make it easier to provide a desired amount of valved area than in the case of radial expansion designs. Slots 242 and 252 are to be slots such that each slot is at a constant axial coordinate on the tube. The slots 242 and 252 are to occupy the circumference of sleeve 240 and tube 250 intermittently. By analogy with Embodiment 1 to 4, the width of slots 252 should be the distance of thermal motion. The width of slots 242 could be that distance or greater. For simplicity of illustration the width of slots 242 is shown as being the same as the width of slots 252. The edges of the slots 242 and 252 must be located relative to each other so that at the hot extreme temperature the slots completely block each other and at the cold extreme temperature the slots are completely open.

The thermal expansion sleeve 240 would expand and contract not only axially but also radially, if it were a complete tube. The axial expansion is useful here but the radial expansion is not. Radial expansion or contraction could produce a gap (source of leakage) at hot conditions or binding at cold conditions. To overcome this, the sleeve 240 is preferably a tube which has a slit 270 cut through its entire axial length at one location (see FIG. 6C). Thus, instead of being a tube continuous around its entire circumference, the sleeve 240 would occupy slightly less than 360 degrees of arc. Also, the tube used to make sleeve 240 is preferably of a natural diameter such that it has to be sprung outward slightly to install it around tube 250. This springiness would keep the inner surface of sleeve 240 in close contact with the outer surface of tube 250, which is good for preventing leaks in the valving action. In addition, the slit and the springiness together mean that what would for a complete circular tube be radial expansion is transformed into expansion in the circumferential direction, which is harmless for us.

The principal advantage of designs using axial thermal expansion is that more arbitrary amounts of thermally valved area can be provided. A disadvantage is that extra parts are required in the form of the tube and related parts which house the thermal reservoir element. Also, the available cross-sectional flow area through the thermal reservoir element is smaller than it is for embodiments such as embodiments 1 to 4 where the thermal reservoir element uses the full inside diameter of the pressure vessel.

Embodiment 6

Another embodiment using axial differential thermal expansion is also possible, using doubly valved flow control rather than singly valved flow control. Embodiment 6 is similar to Embodiment 5, except for the addition of the second temperature-dependent valving element. All corresponding parts in this embodiment are numbered as in Embodiment 5 but are denoted with a prime.

Figure 7A:
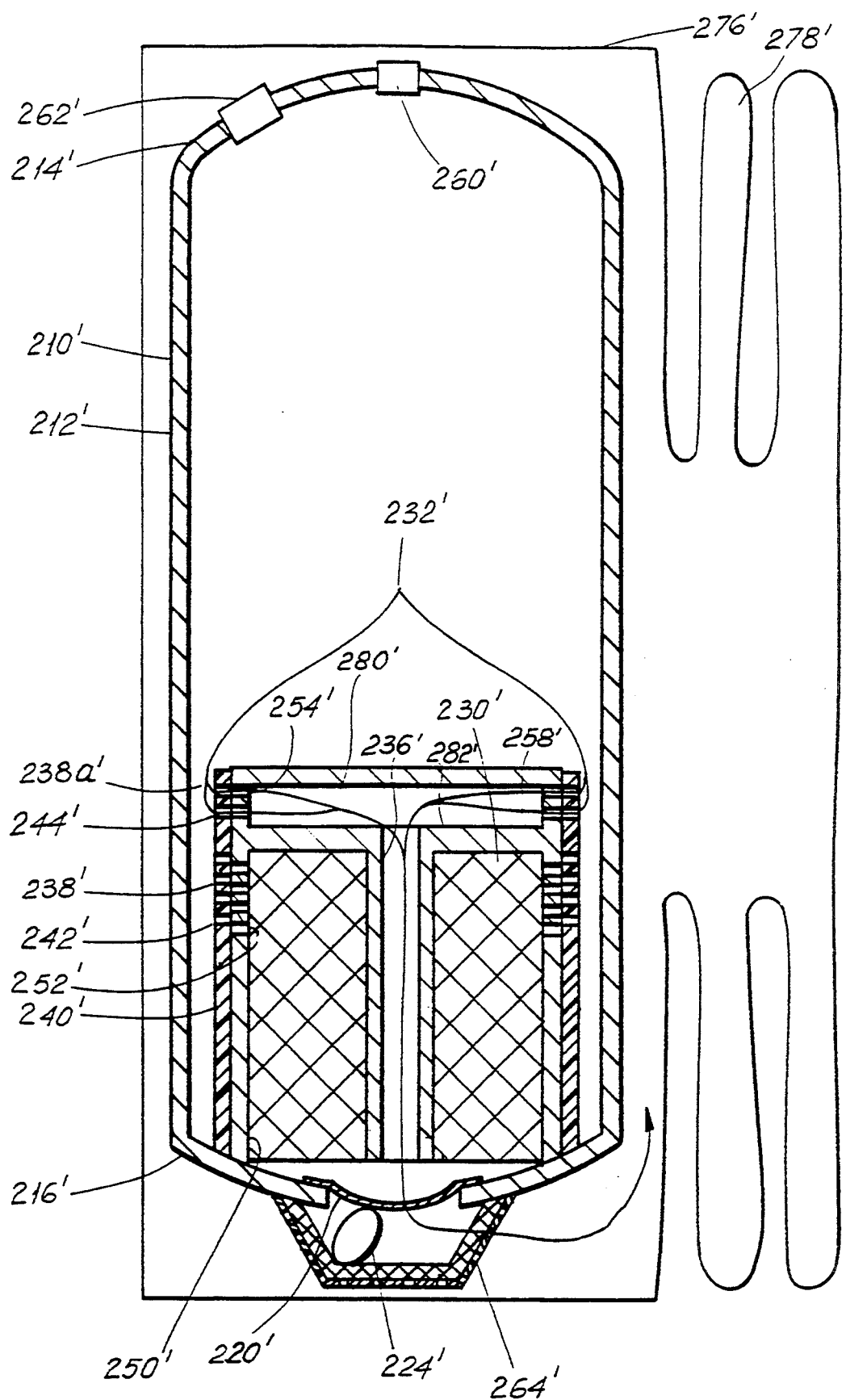
FIG. 7A is a view similar to FIG. 2A utilizing a sixth embodiment of temperature compensating valving system shown in its closed position.
Figure 7B:
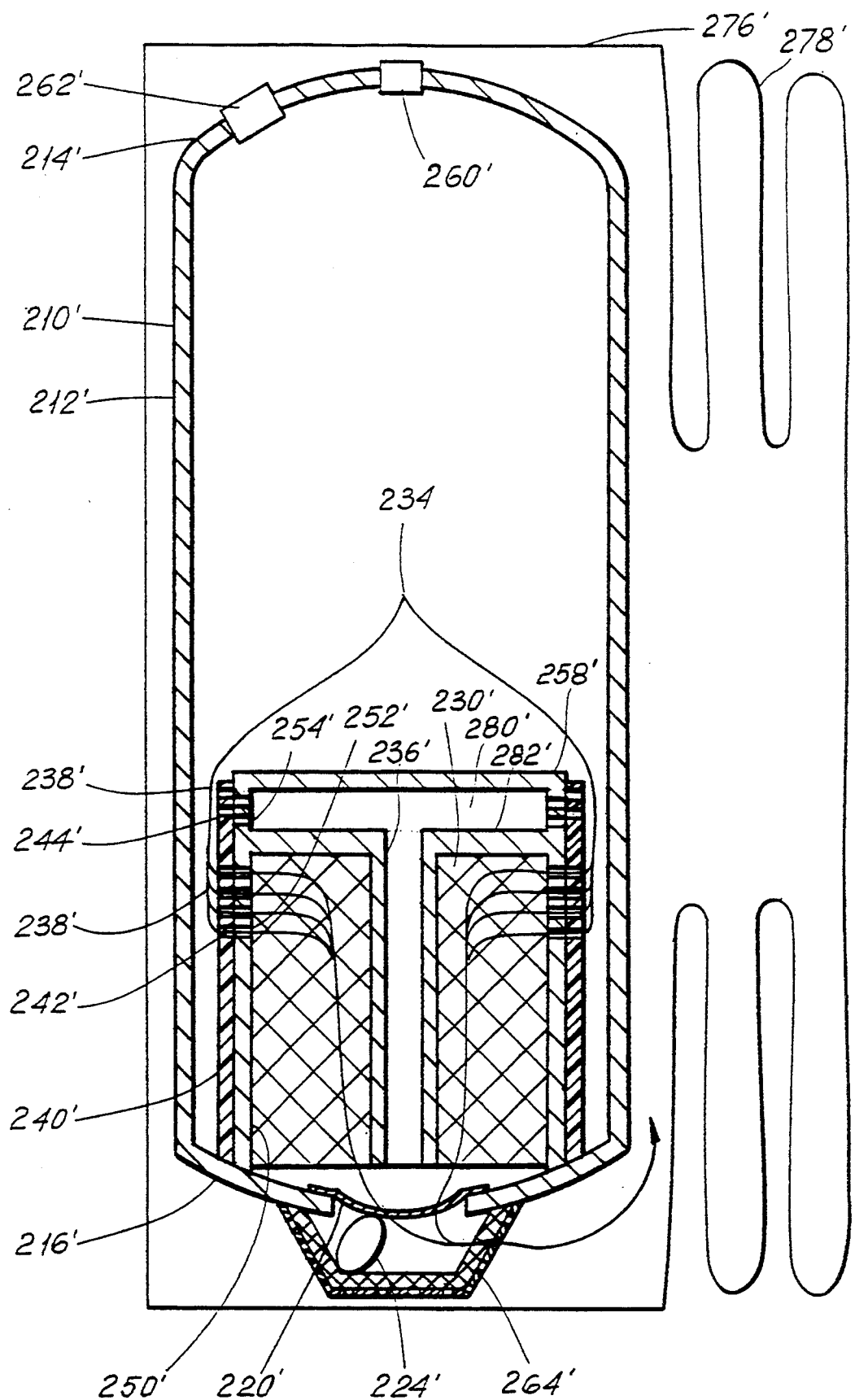
FIG. 7B is a similar view of the valving system of FIG. 7A.

This embodiment is shown in FIG. 7. FIG. 7A shows the configuration at the hot extreme temperature, and FIG. 7B shows the configuration at the cold extreme temperature. The components numbered previously for Embodiment 5 are all present in this embodiment, except that holes 256 are replaced by several components described next. In order for thermal motion to be available for the second valving, the entrance to the noncompensated flowpath 232' must be located near where the valving formed by slots 242' and 252' is already located, because that is where the available thermal motion is greatest (farthest away from anchor point 258). This means that flowpath 232' must be brought through thermal reservoir element 230' so as to avoid contact with thermal reservoir element 230' by means of a tube 236', which is shown centrally located at the axis of the device. This means that there must be a first end cap 282', with a hole in it, followed by a small region 280' formed by extending tube 250' further than it was in Embodiment 5, followed by a second end cap 258'. The newly created region serves to receive gas flow passing through the valving formed by slots 244' and 254' and then to direct that gas flow through tube 236'.

In this embodiment the noncompensated flowpath 232' causes gas to exit from the pressure vessel by passing through valving formed by slots 244' and 254' but without passing through the thermal reservoir element 230'. The compensated flowpath 234' causes gas to exit the pressure vessel so as to pass through both valving formed by slots 242' and 252' and also pass through the thermal reservoir element 230'. The positions of slots 242' and 252' and 244' and 254' must be arranged so that at the cold extreme temperature the valving formed by slots 242' and 252' is completely open while the valving formed by slots 244' and 254' is completely closed. The positions must also be arranged so that at the hot extreme temperature the valving formed by slots 242' and 252' is completely closed while the valving formed by slots 244' and 254' is completely open.

Just as Embodiment 3 will produce a narrower range of inflator output as a function of temperature than will Embodiment 2, Embodiment 6 will produce a narrower range of inflator output than will Embodiment 5. As commented at the end of Embodiment 3, there is also a possible design in which noncompensated flowpath 232 is valved while compensated flowpath 234 is always open.

Embodiment 7

Figure 8:
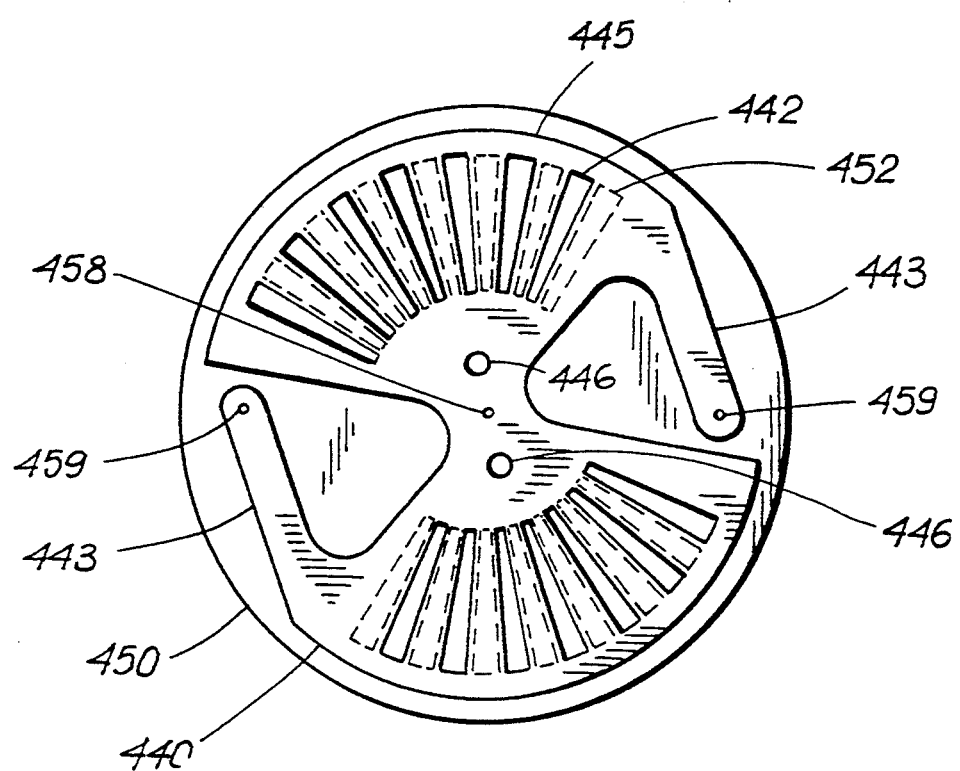
FIG. 8 is a plan view of a valving system expandable in a circumferential direction in accordance with a seventh embodiment.

The last possible principal direction of thermal motion is circumferential. One such embodiment is shown in FIG. 8. The goal of any such embodiment is to have a variable area whose narrow (variable) dimension is in the circumferential direction. The direction of motion due lo to thermal expansion must involve some angular displacement of one disc, or a portion of the disc, relative to the other disc.

Embodiment 7, shown in FIG. 8, is one way of accomplishing this, and this embodiment is otherwise the same as Embodiment of FIG. 2. The disc 440 shown in FIG. 8 is the disc made of the high thermal expansion material and has portions cut out in certain shapes. A perfectly axisymmetric design generally does not produce angular rotation, so it is necessary to have nonaxisymmetric features in order to create angular rotation. This design includes two principal features: a straight leg-like feature 443 and a remaining portion 445 of the disc which is sectors of a circle. The straight leg-like feature is preferably oriented somewhat along the circumferential direction, although it does not have to be completely aligned along the circumferential direction. In the design shown in FIG. 8, there is a pair of each of these features. Actually, it is only the leg-like feature 443 which must be made of a high thermal expansion material. The sectors could be made out of another material, but for convenience they are shown as made of the same material for convenience. The straight leg-like feature serves as a thermal expansion leg because it is essentially long, straight and one-dimensional. The remainder of the disc is a sector of a circle, a substantial portion of a circle, and so its thermal expansion behavior is similar to that of an entire disc, namely its principal direction of expansion is radial. The two straight leg-like features are arranged in opposite-pointing senses 180 degrees apart so their motions form a couple, and they are arranged so that their thermal expansion motion causes the disc as a whole to rotate angularly by a small amount. In the figure, the straight leg-like feature, together with the edges of the cutaway which creates the leg-like feature out of the initially circular disc, form roughly an equilateral triangle.

At one end of the leg 443, the leg joins the rest of the disc, the sector 445. The other end of the leg, farthest from the rest of the disc, must be anchored to the base 450 by anchor point 459. This anchoring is preferably pivotable. The center of the initially circular disc does not have to be anchored to the base 450, but it may be anchored by means 458 as long as it is done in a pivotable way. There is a useful purpose of such anchoring, namely to support the weight of the disc as a whole. When the two legs expand in length and cause rotation of the disc as a whole, they do create some bending at the place where the leg joins the sector. Because of this, a corner radius is provided at the place where the leg joins the sector.

The portion 445 of disc 440 contains slots 442 which may be straight uniform-width slots or may be trapezoidal in shape. These slots 442 cooperate with slots 452 in structural disc 450 to produce the valving action. This embodiment contains noncompensated flowpath and compensated flowpath, with the valving being provided in compensated flowpath. Noncompensated flowpath comprises always-open holes 446. The configuration shown in FIG. 8 is for the hot initial condition, where slots 442 and 452 block each other. At the cold initial condition, due to contraction of legs 443 and consequent rotation of the entire disc, slots 442 and 452 would line up.

It is to be noted that while embodiment 7 is a thermal expansion device, it depends not on differential thermal expansion as in the previous embodiments, but rather on the absolute thermal expansion of the material out of which the legs are made. In embodiment 7, the part 450 to which the movable part 440 is connected will be a part with circular symmetry. This means that despite having a finite coefficient of thermal expansion and undergoing radial and axial displacement, part 450 will have no displacement at all in the circumferential direction.

Embodiment 7 is a singly-valved embodiment in which the compensated flowpath is valved. By analogy with discussion for earlier embodiments, it is also possible to create a doubly-valved embodiment using circumferential motion. It is also possible to create a singly-valved embodiment in which the noncompensated flowpath is the flowpath which is valved.

It is also possible to produce motion in the circumferential direction by means of a long flexible guided member which undergoes lengthwise thermal expansion and contraction, and which is guided in a circular arc, provided that the member is guided so that its expansion and contraction must be circumferential and cannot result in a change of radius. In some sense this may involve differential thermal expansion relative to possible radial thermal expansion of the guide structure, in which case it is helpful for the long flexible guided member to have a thermal expansion coefficient substantially larger than that of the guide. However, it is also possible for the circumferential thermal expansion of the guide structure to be somewhat more independent of the possible expansion of the guide structure, if an arc angular length of more than one complete circle is used. In that event, motion could theoretically be achieved even if the guide and the guided member had the same thermal expansion coefficient. Of course, friction is likely to be a limiting design consideration in such a design.

Embodiment 8

This is an embodiment of a driver side inflator using thermal expansion. As mentioned previously, a driver side inflator differs from a passenger side inflator in that it fills a smaller volume of bag (typically 65 liters compared to 150 liters), and in having more demanding requirements as far as small size and low weight. The embodiment presented here is not so dimensionally attractive for a driver side inflator, but nevertheless, the principle can be applied to a driver side inflator.

First of all, some of the previous embodiments (Embodiments 1 and 2 and 3 and perhaps 7) could be used for a driver side inflator if they were scaled down in proportion to the reduced volume of the bag to be filled. More specifically, the volume of stored gas would be reduced approximately in that proportion, and this decrease would mainly be used to shorten the length of the cylinder. The mass of the thermal reservoir element would be similarly reduced. For brevity, these need not be presented as separate embodiments.

Figure 9A:
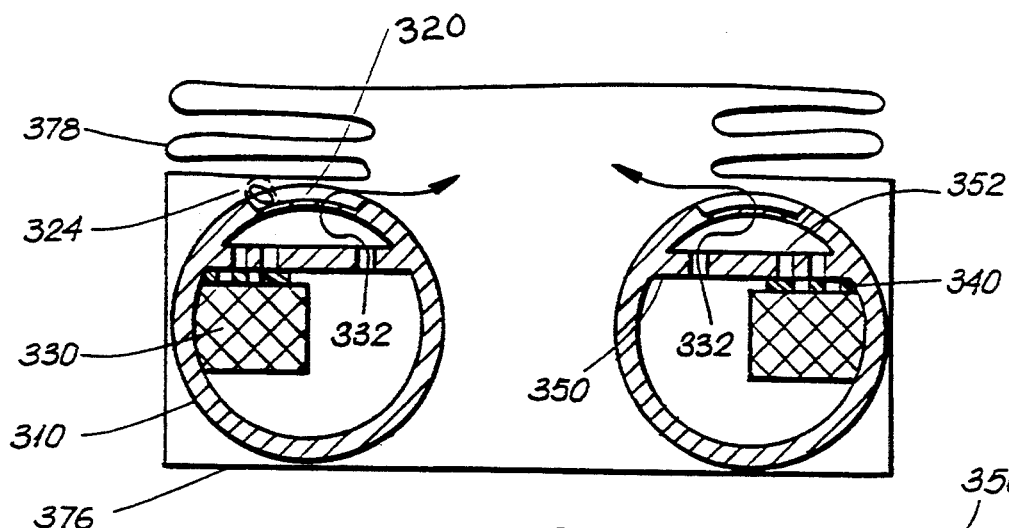
FIG. 9 is a cross-sectional view of a toroidal inflator coupled with a diffuser housing an airbag both shown schematically and having incorporated therein a temperature compensating valving system closing the flow of gas through a convective heat transfer network.
FIG. 9B is a similar view with the valving system of FIG. 9A open.
FIG. 9C is an enlarged fragmentary sectional view showing the O-ring for centering the slidable annular disc.
Figure 9C:
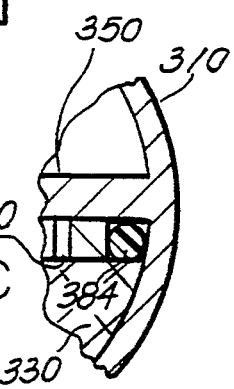
Figure 9B:
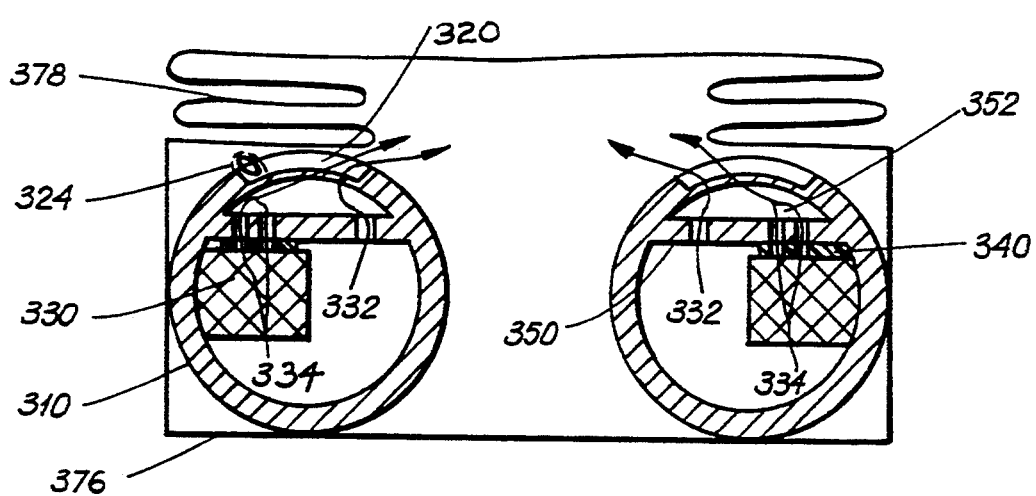

The other possible embodiment for a driver side inflator, presented here as Embodiment 8, is that of a pressure vessel in the form of a torus. In what was just described as a shortened version of Embodiments 1, 2 and 3 for the driver side, the pressure vessel domes or end caps might be structurally inefficient due to bending stresses. A torus, on the other hand, is closer to a pure tension or membrane shape and might be a better candidate for designing a pressure vessel for a driver side inflator. Accordingly, Embodiment 8 is for a pressure vessel in the shape of a torus. This is shown in FIG. 9, with FIG. 9A showing the device at the hot extreme temperature and FIG. 9B showing the device at the cold extreme temperature. Part numbering follows the earlier pattern, this time using numbers in the 300's.

This embodiment uses a pressure vessel 310 which is generally toroidal in shape and contains a sealing means such as a rupturable wall 320 along with a means 324 for inducing rupture of the rupturable wall. Contained inside pressure vessel 310 is thermal reservoir element 330. The embodiment shown here is of the singly-valved variety using differential thermal expansion in the radial direction. This embodiment contains a slidable disc 340, which here may be called the slidable annular disc because of its geometric feature of having a significant portion of its center removed. The slidable annular disc 340 contains slots 342. In slidable contact with the slidable annular disc 340 is the structural annular disc 350, which is structurally connected to the toroidal pressure vessel 310. The structural annular disc 350 contains slots 352. The relative motion of discs 340 and 350 under the influence of temperature causes the slots 342 and 352 to line up with each other at the cold temperature and to block each o other at the hot temperature, thereby providing a valving action for flowpath 334. The structural annular disc 350 also contains orifices or slots which are always open, through which flowpath 332 passes.

The principal difference between this embodiment and the earlier radial-expansion embodiments (Embodiments 1, 2 and 3) is that in this embodiment the center of the slidable disc 340 is not available as an anchoring and locating point for anchoring and locating the slidable annular disc 340 to the structural annular disc 350. Accordingly, it is necessary to provide some other means for keeping the discs concentric. Either the outer edge or the inner edge of the slidable annular disc should be usable for this purpose, with the understanding that both of these surfaces move thermally and that their thermal motion must be absorbed while maintaining concentricity. A possible method would be by using one of these edges of the slidable annular disc to compress a rubber or polymeric O-ring 384, with the compression being in the radial direction. Rings made of rubber or polymer devices of other cross-section could also be used, as could other forms of spring device placed in an axisymmetric pattern. Since any such device would be axisymmetric pattern around the principal axis of the toroidal inflator, the behavior of such an O-ring or spring device should maintain axisymmetry and thus maintain the concentricity of the slidable annular disc.

This embodiment is of the singly-valved variety. By analogy with earlier embodiments, it is apparent that a doubly-valved embodiment could also be constructed. Also by analogy with earlier embodiments, it is apparent that one could also construct a singly-valved variety in which the noncompensated flowpath is valved, instead of the compensated flowpath.

Although several embodiments of the invention have been disclosed and described in detail herein, it should be understood that this invention is in no sense limited thereby and its scope is to be determined by that of the appended claims.

We claim:

1. A stored gas inflator which is operable over a wide range of initial temperatures and such that the dependence of its total output as a function of initial temperature is substantially reduced, comprising:

a vessel containing gas under pressure and having an outlet for the gas;

sealing means sealing the outlet and adapted to open the outlet upon command and to permit passage of the gas through the outlet;

a thermal reservoir element;

a first exiting flowpath means for directing gas out along a first exiting flowpath that substantially bypasses or avoids thermal contact with the thermal reservoir element;

a second exiting flowpath means for directing whatever gas does not leave through the first exiting flowpath means out along a second exiting flowpath that goes through the thermal reservoir element and has substantial thermal contact with the thermal reservoir element;

a temperature-dependent flow control means for varying the amount of gas passing through each of the aforementioned flowpaths.

2. The invention in accordance with claim 1, wherein the temperature-dependent flow control means operates such that at low initial temperatures of the inflator, the fraction of gas which passes through the thermal reservoir element is greater than it is at high initial temperature.

3. The invention in accordance with claim 1, wherein the initial temperature of the thermal reservoir element is substantially the same as the initial temperature of the stored gas.

4. The invention in accordance with claim 1, wherein the thermal reservoir element is inside the vessel.

5. The invention in accordance with claim 4, wherein the first flowpath has a physical boundary to keep it separated from second flow path as it passes through the region occupied by the thermal reservoir element.

6. The invention in accordance with claim 4, wherein the naturally occurring flow pattern inside the inflator is such that the first flowpath substantially avoids passing through the thermal reservoir element.

7. The invention in accordance with claim 1, wherein the thermal reservoir element is outside the vessel.

8. The invention in accordance with claim 1, wherein the temperature-dependent flow control means comprises a first member and a second member, said first member and said second member being disposed to move relative to each other under the influence of changing initial temperature, said relative motion acting to determine the flow area of at least one of the flowpaths.

9. The invention in accordance with claim 8, wherein throughout the transient the temperature-dependent flow control means remains substantially at the setting which was determined by the initial temperature.

10. The invention in accordance with claim 1, wherein the temperature-dependent flow control means comprises a first member and a second member, said first member having a first thermal expansion coefficient and said second member having a second different thermal expansion coefficient, said first member and said second member being disposed so as to move relative to each other due to thermal expansion under the influence of changing temperature, said relative motion acting to determine the flow area of at least one of the flowpaths.

11. The invention in accordance with claim 8, wherein the temperature-dependent flow control means comprises a valving means cooperating with the second exiting flowpath means such that as the initial temperature of the inflator decreases, a flow area increases for the second exiting flowpath through the thermal reservoir element.

12. The invention in accordance with claim 11, wherein the flow area for the first exiting flowpath remains constant and always open.

13. The invention in accordance with claim 8, wherein the temperature-dependent flow control means comprises a valving means cooperating with the first exiting flowpath means such that as the initial temperature of the inflator decreases, a flow area decreases for the first exiting flowpath substantially bypassing the thermal reservoir element.

14. The invention in accordance with claim 13, wherein the flow area for the second exiting flowpath remains constant and always open.

15. The invention in accordance with claim 8, wherein the temperature-dependent flow control means comprises a first valving means cooperating with the first exiting flowpath means and a second valving means cooperating with the second exiting flowpath means such that as the initial temperature of the inflator decreases, a first flow area decreases for the first exiting flowpath substantially bypassing the thermal reservoir element and a second flow area increases for the second exiting flowpath through the thermal reservoir element.

16. The invention in accordance with claim 10, wherein said first member and said second member slide with respect to each other.

17. The invention in accordance with claim 10, wherein the flow area which is varied by the temperature-dependent flow control means is formed by a plurality of slots which are long in one direction and narrow in the other direction, the direction of relative motion being in the direction of the narrow dimension of the slots so as to cause the slots to be covered or uncovered as a function of initial temperature.

18. The invention in accordance with claim 10, wherein the flow area which is varied by the temperature-dependent flow control means is formed by a plurality of holes disposed so that the relative motion of the first and second parts causes the holes to be covered or uncovered as a function of initial temperature.

19. The invention in accordance with claim 10, wherein the relative motion of the members is in a radial direction.

20. The invention in accordance with claim 19, wherein the anchor point for radial motion is at the center of one of the members.

21. The invention in accordance with claim 20, wherein the flow area which is varied by the temperature-dependent flow control means is formed by a plurality of slots which are long in one direction and narrow in the other direction, the direction of relative motion being in the direction of the narrow dimension of the slots so as to cause the holes to be covered or uncovered as a function of initial temperature, and wherein the slots are arcs of circles concentric with the anchor point.

22. The invention in accordance with claim 10, wherein the principal relative motion of the members is in the axial direction.

23. The invention in accordance with claim 22, wherein the anchor point is at an end of the sleeve.

24. The invention in accordance with claim 22, wherein the slidable member is a sleeve formed by cutting a tube with a longitudinal cut.

25. The invention in accordance with claim 10, wherein the relative motion is in a circumferential direction.

26. The invention in accordance with claim 25, wherein the movable part comprises one or more essentially straight lengths of thermally expansive material, herein referred to as legs, connected to a region of material in which slots are disposed to perform the valving function, the legs being disposed in a direction which is at least partly circumferential so that as they thermally expand or contract they cause the movable part to rotate, the rotation causing the valving function, the end of each leg which is farthest from the connection with the region of material being anchored, the movable part being free to rotate.

27. The invention in accordance with claim 25, wherein the movable part is caused to rotate by a thermally expansive member which is guided by a guide or a track, the guide or track being curved, the expansive member being flexible.

28. The invention in accordance with claim 27, wherein the guide or track is curved such that the thermally expansive member occupies an angular extent of more than one full circle or revolution.

29. The invention in accordance with claim 1, wherein the inflator has a first time constant of discharge at cold initial conditions and a second different time constant of discharge at hot initial conditions, and the first and second time constants are related so that during the time period of interest for an accident, at cold initial conditions the inflator comes closer to complete discharge than it does at hot initial conditions.

30. A stored gas inflator which is operable over a wide range of initial temperatures and such that its output is modified as a function of initial temperature, comprising:
a vessel containing gas under pressure and having an outlet for the gas; sealing means sealing the outlet and adapted to open the outlet upon command and to permit passage of the gas through the outlet; a temperature-dependent flow control means for varying the exiting flow area,
whereby at cold initial conditions the inflator reaches complete discharge more quickly than it does at hot initial conditions, and whereby at hot conditions some gas remains inside the vessel at the time of the end of the accident while at cold initial conditions less of the gas remains inside the vessel at the time of the end of the accident.

31. The invention in accordance with claim 1, wherein the high thermal expansion material is selected from the group consisting of polytetrafluoroethylene, and other fluoropolymers, and other polymeric materials having a larger thermal expansion coefficient than the low expansion material, and metals having a thermal expansion coefficient larger than that of the low expansion material.

32. The invention in accordance with claim 1, wherein the low thermal expansion material is selected from the group consisting of aluminum, steel, stainless steel, Invar, other metals, and polymeric materials, possibly comprising fiber reinforcement, which have a thermal expansion coefficient smaller than that of the high thermal expansion material.

33. The invention in accordance with claim 1, wherein the thermal reservoir element is in the form of a porous matrix or is in the form of a wire mesh or is in the form of a honeycomb.

34. The invention in accordance with claim 1, wherein the material for the thermal reservoir element is selected from the group consisting of aluminum, stainless steel, other metals and polymeric materials.

35. The invention in accordance with claim 1, wherein the stored gas is helium or a mixture comprising a substantial fraction of helium.

36. The invention in accordance with claim 1, wherein the vessel is cylindrical in shape.

37. The invention in accordance with claim 1, wherein the vessel is toroidal in shape.

38. The invention in accordance with claim 37, further comprising centering means for keeping the first member and the second member concentric with respect to each other.

39. The invention in accordance with claim 38, wherein the centering means comprises an O-ring.

40. The invention in accordance with claim 1, further comprising housing and airbag such that substantially all of the exiting gas enters an inflatable occupant restraint disposed to inflate and protect a vehicle occupant, wherein the command to open the outlet of the inflator is obtained from a sensor disposed to detect a vehicle crash.

41. The invention in accordance with claim 30, wherein a thermal reservoir element is provided and is so constructed and arranged to (i) passively exist at essentially the same temperature as the stored gas, as the inflator undergoes gradual temperature changes due to changes in the environment to which it is exposed, (ii) supply sufficient heat to the gas exiting through the thermal reservoir element, (iii) possess sufficient heat capacity, thermal conductivity and surface area to supply sufficient heat, and (iv) possess mechanical strength to withstand pressure differences during the exiting of the gas therethrough without gross deformation.

42. The invention in accordance with claim 1, wherein the thermal reservoir element being so constructed and arranged to (i) passively exist at essentially the same temperature as the stored gas, as the inflator undergoes gradual temperature changes due to changes in the environment to which it is exposed, (ii) supply sufficient heat to the gas exiting through the thermal reservoir element, (iii) possess sufficient heat capacity, thermal conductivity and surface area to supply sufficient heat, and (iv) possess mechanical strength to withstand pressure differences during the exiting of the gas therethrough without gross deformation.

43. A stored gas inflator for an airbag and which is operable over a wide temperature range and whose temperature dependance during operation is substantially reduced, comprising:
a vessel containing gas under pressure and having an outlet for the gas;
a sealing means for sealing the outlet and adapted to open the outlet and to permit passage of the gas through the outlet;
a thermal reservoir element adjacent the outlet and normally being at substantially the same initial temperature as the gas stored in the vessel;
said vessel containing a first exiting flowpath means for directing the gas out through the open outlet along a first exiting flowpath with a first orifice area that bypasses the thermal reservoir element and out through the open outlet;
said vessel containing a second exiting flowpath means for directing the gas along a second exiting flowpath with a second orifice area through the thermal reservoir element and out through the open outlet;

a temperature-dependent flow control means that cooperates with at least one of the exiting flow path means that creates a first fraction of gas exiting through the first exiting flowpath and second fraction of gas exiting through the second exiting flowpath and said temperature-dependent flow control means being operable such that at low initial temperatures of the inflator, the second fraction of gas is larger than it is at a high initial temperature.

44. The invention in accordance with claim 43, wherein the temperature-dependent flow control means comprises a second valving means cooperating with the second exiting flowpath means such that as the initial temperature of the inflator decreases, the second flow area increases for the second exiting flowpath through the thermal reservoir element.

45. The invention in accordance with claim 43, wherein the temperature dependent flow control means comprises a first valving means cooperating with the first exiting flowpath means such that as the initial temperature of the inflator decreases, the first flow area decreases for the first exiting flowpath that bypasses the thermal reservoir element.

46. The invention in accordance with claim 43, wherein the temperature-dependent flow control means comprises a second valving means cooperating with the second exiting flowpath means such that as the initial temperature of the inflator decreases, the second flow area increases for the second exiting flowpath through the thermal reservoir element.

47. The invention in accordance with claim 43, wherein the temperature-dependent flow control means comprises a first and second member slidable relative to one another, said first member having a first thermal expansion coefficient and said second member having a second different thermal expansion coefficient.

48. The invention in accordance with claim 47, wherein the inflator has a longitudinal axis extending through the outlet and the members are discs that slide normal to the axis.

49. The invention in accordance with claim 48, wherein the temperature-dependent flow control means comprises a second valving means cooperating with the second exiting flowpath means such that as the initial temperature of the inflator decreases, the second flow area increases for the second exiting flowpath through the thermal reservoir element.

50. The invention in accordance with claim 48, wherein the temperature dependent flow control means comprises a first valving means cooperating with the first exiting flowpath means such that as the initial temperature of the inflator decreases, the first flow area decreases for the first exiting flowpath that bypasses the thermal reservoir element.

51. The invention in accordance with claim 48, wherein the temperature-dependent flow control means comprises a second valving means cooperating with the second exiting flowpath means such that as the initial temperature of the inflator decreases, the second flow area increases for the second exiting flowpath through the thermal reservoir element.

52. The invention in accordance with claim 47, wherein the inflator has a longitudinal axis extending through the outlet and the members are cylindrical and slide along a path parallel to and concentric with the axis.

53. The invention in accordance with claim 52, wherein the temperature-dependent flow control means comprises a second valving means cooperating with the second exiting flowpath means such that as the initial temperature of the inflator decreases, the second flow area increases for the second exiting flowpath through the thermal reservoir element.

54. The invention in accordance with claim 52, wherein the temperature dependent flow control means comprises a first valving means cooperating with the first exiting flowpath means such that as the initial temperature of the inflator decreases, the first flow area decreases for the first exiting flowpath that bypasses the thermal reservoir element.

55. The invention in accordance with claim 52, wherein the temperature-dependent flow control means comprises a second valving means cooperating with the second exiting flowpath means such that as the initial temperature of the inflator decreases, the second flow area increases for the second exiting flowpath through the thermal reservoir element.

56. The invention in accordance with claim 47, wherein the members slide radially relative to the axis and the first and second orifice area constitute arcs.

57. The invention in accordance with claim 47, wherein the first material is plastic and the second material is a metal.

58. The invention in accordance with claim 57, wherein the plastic is polytetrafluoroethylene and the metal is selected from the group consisting of aluminum, steel and stainless steel.

59. The invention in accordance with claim 43, wherein the thermal reservoir element is a porous matrix.

60. The invention in accordance with claim 59, wherein the matrix is wire mesh.

61. The invention in accordance with claim 43, wherein the gas is helium.

62. The invention in accordance with claim 43, wherein the thermal reservoir element is so constructed and arranged to supply heat to the gas exiting therethrough.

63. The invention in accordance with claim 43, wherein the temperature dependent flow control means is so constructed and arranged to function as a single valve controlling the flow of gas through the thermal reservoir element.

64. The invention in accordance with claim 43, wherein temperature dependent flow control means is so constructed and arranged to function as a dual valve controlling the flow of gas through the thermal reservoir element and that which bypasses this element.

65. The invention in accordance with claim 43, wherein the vessel is cylindrical in shape.

66. The invention in accordance with claim 43, wherein the vessel is toroidal in shape.

67. The invention in accordance with claim 43, wherein the temperature dependent flow control means includes a pair of temperature compensating members with openings and being movable relative to one another in response to temperature changes to alter the relationship between the opening of the respective members and consequently the amount of gas capable of passing therethrough.

68. The invention in accordance with claim 43, wherein the thermal reservoir element being so constructed and arranged to (i) passively exist at essentially the same temperature as the stored gas, as the inflator undergoes gradual temperature changes due to changes in the environment to which it is exposed (ii) supply sufficient heat to the existing gas exiting through the thermal reservoir element (iii) possess sufficient heat capacity, thermal conductivity and surface area to supply sufficient heat and (iv) possess mechanical strength to withstand pressure differences during the exiting of the gas therethrough without gross deformation.

69. The invention in accordance with claim 1, wherein the mass times specific heat capacity of the thermal reservoir element ranges from 0.1 times the mass of stored gas times the specific heat capacity at constant pressure of the stored gas to 10 times the mass of stored gas times the specific heat capacity at constant pressure of the stored gas.

70. The invention in accordance with claim 1, wherein the thermal reservoir element is in the form of a wire mesh and the diameter of the wire making up the wire mesh is between 0.0001 inch and 0.039 inch.

71. The invention in accordance with claim 22, wherein the motion in the axial direction is the relative motion between a tube and a slidable member disposed around the tube, the slidable member and the tube having different coefficients of thermal expansion, the slidable member being anchored to the tube at one point which is near the end of the slidable member farthest from the slots which perform the valving function.

* * * * *

UNITED STATES PATENT AND TRADEMARK OFFICE
CERTIFICATE OF CORRECTION

PATENT NO. : 5,433,476
DATED : Jul. 18, 1995
INVENTOR(S) : Peter Materna, et al

It is certified that error appears in the above-indentified patent and that said Letters Patent is hereby corrected as shown below:

Column 15, line 50, change "O.S E-4 0.5 m^2" to

-- 0.5 E-4 m^2 --.

Signed and Sealed this

Tenth Day of October, 1995

Attest:

BRUCE LEHMAN

*Attesting Officer*    *Commissioner of Patents and Trademarks*